(12) United States Patent
Hsueh et al.

(10) Patent No.: US 10,509,202 B2
(45) Date of Patent: Dec. 17, 2019

(54) OPTICAL IMAGING LENS SYSTEM, IMAGE CAPTURING UNIT AND ELECTRONIC DEVICE

(71) Applicant: LARGAN Precision Co., Ltd., Taichung (TW)

(72) Inventors: Chun-Che Hsueh, Taichung (TW); Shu-Yun Yang, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/634,781

(22) Filed: Jun. 27, 2017

(65) Prior Publication Data

US 2018/0252897 A1  Sep. 6, 2018

(30) Foreign Application Priority Data

Mar. 1, 2017  (TW) .............................. 106106709 A

(51) Int. Cl.
| | | |
|---|---|---|
| G02B 13/00 | (2006.01) | |
| G02B 9/62 | (2006.01) | |
| G02B 13/04 | (2006.01) | |
| H04N 5/225 | (2006.01) | |

(52) U.S. Cl.
CPC ........... *G02B 13/0045* (2013.01); *G02B 9/62* (2013.01); *G02B 13/04* (2013.01); *H04N 5/2253* (2013.01)

(58) Field of Classification Search
CPC ........ G02B 9/62; G02B 13/0045; G02B 9/64; G02B 13/0055; G02B 13/04; G02B 13/06
USPC .......................... 359/713–714, 749–752, 762
See application file for complete search history.

(56) References Cited

U.S. PATENT DOCUMENTS

| | | |
|---|---|---|
| 3,352,620 A | 11/1967 | Scidmore et al. |
| 3,438,689 A | 4/1969 | Wehr |
| 3,515,463 A | 6/1970 | Rosenberger |
| 4,948,238 A | 8/1990 | Araki |
| 5,675,440 A | 10/1997 | Kanamori |
| 5,691,851 A | 11/1997 | Nishio et al. |
| 6,028,717 A | 2/2000 | Kohno et al. |
| 6,191,896 B1 | 2/2001 | Itoh |
| 6,208,472 B1 | 3/2001 | Wachi |
| 10,001,630 B1 * | 6/2018 | Ko ......................... G02B 13/18 |
| 2007/0053075 A1 | 3/2007 | Kamo |
| 2015/0177482 A1 | 6/2015 | Bone et al. |
| 2015/0177484 A1 | 6/2015 | Hsu et al. |
| 2015/0177485 A1 | 6/2015 | Hsu et al. |

(Continued)

FOREIGN PATENT DOCUMENTS

| | | |
|---|---|---|
| JP | 1990093511 | 4/1990 |
| JP | 1995333504 | 12/1995 |

(Continued)

*Primary Examiner* — Jordan M Schwartz
(74) *Attorney, Agent, or Firm* — Hanley, Flight and Zimmerman, LLC

(57) ABSTRACT

An optical imaging lens system includes six lens elements which are, in order from an object side to an image side: a first lens element, a second lens element, a third lens element, a fourth lens element, a fifth lens element and a sixth lens element. The first lens element has negative refractive power. The fourth lens element has an image-side surface being convex in a paraxial region thereof. The fifth lens element has positive refractive power. The sixth lens element has an object-side surface being convex in a paraxial region thereof.

30 Claims, 26 Drawing Sheets

(56) References Cited

U.S. PATENT DOCUMENTS

| | | | |
|---|---|---|---|
| 2016/0124185 A1 | 5/2016 | Tang et al. | |
| 2017/0045715 A1 | 2/2017 | Tang et al. | |
| 2017/0045716 A1 | 2/2017 | Tang et al. | |
| 2017/0068070 A1 | 3/2017 | Tang et al. | |
| 2017/0068071 A1 | 3/2017 | Tang et al. | |
| 2017/0097498 A1 | 4/2017 | Amanai | |
| 2017/0199355 A1* | 7/2017 | Kitahara | G02B 13/0045 |
| 2017/0307858 A1* | 10/2017 | Chen | G02B 9/64 |
| 2018/0203211 A1* | 7/2018 | Kim | G02B 13/06 |
| 2018/0356616 A1* | 12/2018 | Bone | G02B 13/18 |

FOREIGN PATENT DOCUMENTS

| | | |
|---|---|---|
| JP | 2000352665 | 12/2000 |
| JP | 2007139985 | 6/2007 |
| JP | 2009-300797 | 12/2009 |
| WO | 2012105181 | 8/2012 |

* cited by examiner

OPTICAL IMAGING LENS SYSTEM, IMAGE CAPTURING UNIT AND ELECTRONIC DEVICE

RELATED APPLICATIONS

This application claims priority to Taiwan Application 106106709, filed Mar. 1, 2017, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

With the development of miniaturized optical systems getting more diverse, the product specifications are becoming more stringent. In order to capture an image having high reality, the need for better imaging functionality is now more demanding than ever. In addition, in order to cope with a wider range of imaging scope, the angle of view of the optical systems has a tendency to increase. On the other hand, with various types of electronic devices on the market pursuing advantages such as light and thin, easy to carry properties, compactness of the optical systems is one of the indispensable elements nowadays.

Furthermore, cameras featuring good image recognition capability have been widely applied to various kinds of electronic devices, such as motion sensing input devices, image recognition systems, head mounted displays, multiple lens devices, dashboard cameras and network surveillance devices. These cameras are capable of detecting motions and surroundings precisely even in a low light condition and thus providing high-quality and low noise images.

However, the conventional optical systems are unable to meet the requirements of a wide field of view and good image recognition capability, simultaneously. Accordingly, there is a need to develop a wide-angle optical system featuring high image quality, large aperture stop, good image recognition capability and compact size.

SUMMARY

According to one aspect of the present disclosure, an optical imaging lens system includes six lens elements. The six lens elements are, in order from an object side to an image side, a first lens element, a second lens element, a third lens element, a fourth lens element, a fifth lens element and a sixth lens element. The first lens element has negative refractive power. The fourth lens element has an image-side surface being convex in a paraxial region thereof. The fifth lens element has positive refractive power. The sixth lens element has an object-side surface being convex in a paraxial region thereof. When a focal length of the optical imaging lens system is f, an axial distance between the third lens element and the fourth lens element is T34, an axial distance between the fifth lens element and the sixth lens element is T56, an axial distance between an object-side surface of the first lens element and an image-side surface of the sixth lens element is TD, a central thickness of the fifth lens element is CT5, and a central thickness of the sixth lens element is CT6, the following conditions are satisfied:

$$0 < f/T56 < 4.50;$$

$$0 < f/T34 < 4.0; \text{ and}$$

$$1.20 < TD/(CT5+T56+CT6) < 4.0.$$

According to another aspect of the present disclosure, an image capturing unit includes the aforementioned optical imaging lens system and an image sensor, wherein the image sensor is disposed on an image surface of the optical imaging lens system.

According to still another aspect of the present disclosure, an electronic device includes the aforementioned image capturing unit.

According to yet still another aspect of the present disclosure, an optical imaging lens system includes six lens elements. The six lens elements are, in order from an object side to an image side, a first lens element, a second lens element, a third lens element, a fourth lens element, a fifth lens element and a sixth lens element. The first lens element has negative refractive power. The second lens element has negative refractive power. The fourth lens element has an image-side surface being convex in a paraxial region thereof. The fifth lens element has positive refractive power. When a focal length of the optical imaging lens system is f, an axial distance between the first lens element and the second lens element is T12, an axial distance between the third lens element and the fourth lens element is T34, an axial distance between the fourth lens element and the fifth lens element is T45, an axial distance between the fifth lens element and the sixth lens element is T56, a central thickness of the fifth lens element is CT5, and a central thickness of the sixth lens element is CT6, the following conditions are satisfied:

$$0 < f/T56 < 4.80;$$

$$0.15 < CT5/CT6 < 1.90; \text{ and}$$

$$0 < (T12+T45)/T34 < 2.0.$$

According to yet still another aspect of the present disclosure, an optical imaging lens system includes six lens elements. The six lens elements are, in order from an object side to an image side, a first lens element, a second lens element, a third lens element, a fourth lens element, a fifth lens element and a sixth lens element. The first lens element has negative refractive power. The second lens element has negative refractive power. The fourth lens element has an object-side surface being concave in a paraxial region thereof and an image-side surface being convex in a paraxial region thereof. The fifth lens element has positive refractive power. The sixth lens element has an object-side surface being convex in a paraxial region thereof. When a focal length of the optical imaging lens system is f, an axial distance between the fifth lens element and the sixth lens element is T56, a curvature radius of an image-side surface of the third lens element is R6, and a curvature radius of the object-side surface of the fourth lens element is R7, the following conditions are satisfied:

$$0 < f/T56 < 10.0; \text{ and}$$

$$-1.0 < (R6+R7)/(R6-R7) < 12.0.$$

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
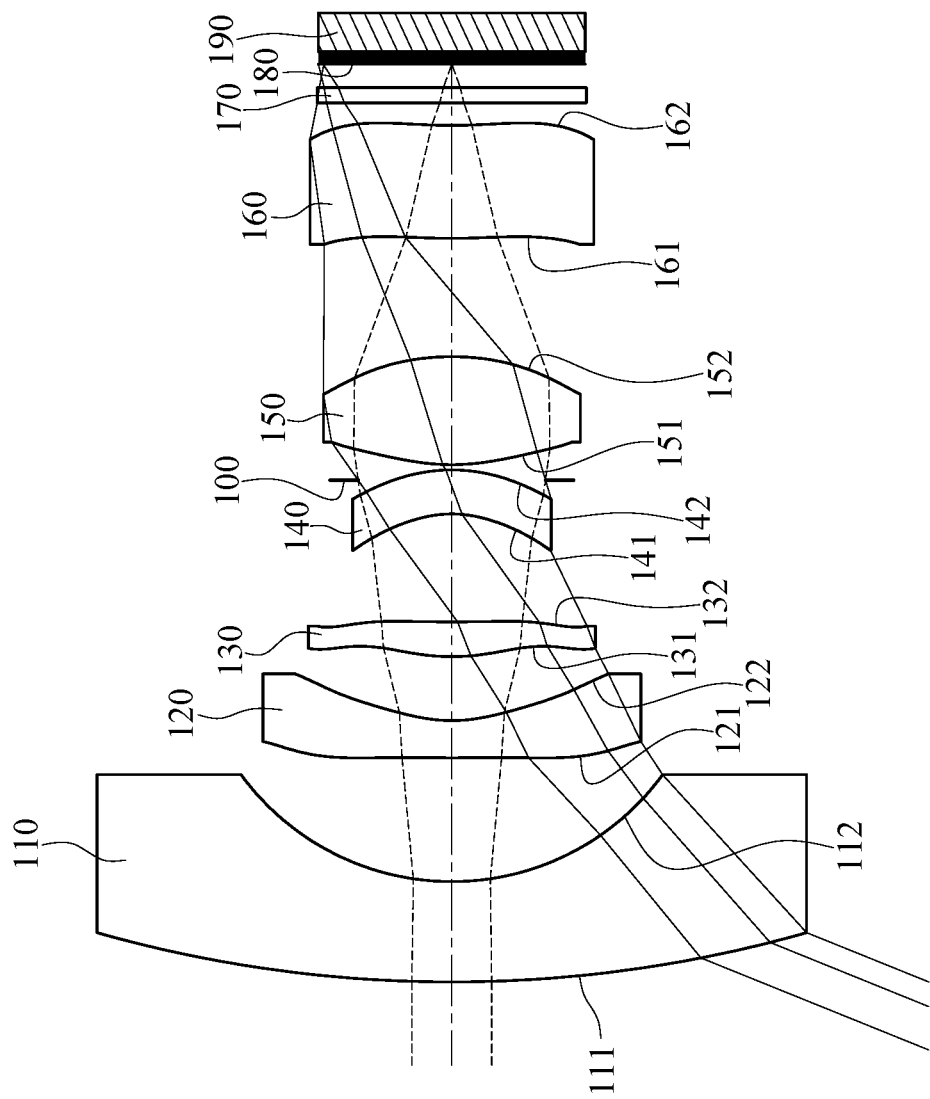
FIG. 1 is a schematic view of an image capturing unit according to the 1st embodiment of the present disclosure.

An optical imaging lens system includes, in order from an object side to an image side, a first lens element, a second lens element, a third lens element, a fourth lens element, a fifth lens element and a sixth lens element.

The first lens element has negative refractive power. Therefore, it is favorable for providing the optical imaging lens system with a retro-focus configuration for gathering light from large angle of view so as to increase the area of an image surface where light is projected onto, and thus the optical imaging lens system is applicable to a wide range of applications.

The second lens element can have negative refractive power. Therefore, the refractive power of the second lens element is favorable for obtaining a wide-angle lens configuration so as to increase the area of the image surface where light is projected onto.

The third lens element has an object-side surface and an image-side surface, and either the object-side surface of the third lens element, the image-side surface of the third lens element or both the object-side surface and the image-side surface of the third lens element can have at least one inflection point. Therefore, the aspheric surfaces is favorable for flexibly designing the third lens element so as to reduce a total track length of the optical imaging lens system; furthermore, it is favorable for correcting aberrations at the object side of the optical imaging lens system, and thereby improving the image quality.

The fourth lens element can have an object-side surface being concave in a paraxial region thereof; therefore, it is favorable for moderating the incident light from large angle of view and correcting astigmatism so as to meet the requirements of wide angle effect and high image quality. Furthermore, the fourth lens element has an image-side surface being convex in a paraxial region thereof; therefore, it is favorable for correcting aberrations and reducing sensitivity so as to further improve the image quality.

The fifth lens element has positive refractive power. Therefore, it is favorable for providing light convergence capability so as to reduce the total track length of the optical imaging lens system, and thereby achieving compactness.

The sixth lens element has an object-side surface being convex in a paraxial region thereof. Therefore, controlling the shape of the sixth lens element is favorable for strengthening the capability of the sixth lens element for correcting aberrations and reducing stray light so as to increase illuminance and improve the image quality.

When a focal length of the optical imaging lens system is f, and an axial distance between the fifth lens element and the sixth lens element is T56, the following condition is satisfied: $0 < f/T56 < 10.0$. Therefore, it is favorable for obtaining wide angle effect and short focal length so as to reduce chromatic aberration in the axial direction; moreover, it is favorable for properly adjusting the axial distance between the fifth lens element and the sixth lens element so as to obtain a sufficient space for accommodating additional opto-components, and thus the mechanical design flexibility of the optical imaging lens system is increased, and thereby reducing a back focal length and further improving the image quality. Preferably, the following condition can be satisfied: $0 < f/T56 < 4.80$. More preferably, the following condition can be satisfied: $0 < f/T56 < 4.50$. Much more preferably, the following condition can be satisfied: $0 < f/T56 < 3.0$.

When the focal length of the optical imaging lens system is f, and an axial distance between the third lens element and the fourth lens element is T34, the following condition can be satisfied: 0<f/T34<4.0. Therefore, it is favorable for obtaining wide angle effect and short focal length so as to enlarge the field of view; furthermore, it is favorable for properly adjusting the axial distance between the third lens element and the fourth lens element to correct aberrations, and thereby obtaining high image quality as well as high assembling yield rate. Preferably, the following condition can be satisfied: 0<f/T34<3.0.

When an axial distance between an object-side surface of the first lens element and an image-side surface of the sixth lens element is TD, the axial distance between the fifth lens element and the sixth lens element is T56, a central thickness of the fifth lens element is CT5, and a central thickness of the sixth lens element is CT6, the following condition can be satisfied: 1.20<TD/(CT5+T56+CT6) <4.0. Therefore, a proper ratio of the axial distance between an object-side surface of the fifth lens element and the image-side surface of the sixth lens element to a total length of the optical imaging lens system is favorable for keeping the optical imaging lens system compact; furthermore, it is favorable for reducing the incident angle of light projecting onto the image surface so as to improve the image-sensing efficiency of the image sensor, and thereby reducing vignetting at the peripheral region of the image to improve the image quality. Preferably, the following condition can be satisfied: 1.20<TD/(CT5+T56+CT6)<3.85. When the central thickness of the fifth lens element is CT5, and the central thickness of the sixth lens element is CT6, the following condition can be satisfied: 0.15<CT5/CT6<1.90. Therefore, a proper ratio of the central thickness of the fifth lens element to the central thickness of the sixth lens element is favorable for reducing the sensitivity at the image side of the optical imaging lens system so as to improve the image quality. Preferably, the following condition can be satisfied: 0.20<CT5/CT6<1.70.

When an axial distance between the first lens element and the second lens element is T12, the axial distance between the third lens element and the fourth lens element is T34, and an axial distance between the fourth lens element and the fifth lens element is T45, the following condition can be satisfied: 0<(T12+T45)/T34<2.0. Therefore, it is favorable for properly arranging the axial distances between each adjacent lens element so as to obtain a balance among high assembling yield rate, high image quality and compactness, and thus the optical imaging lens system is applicable to a wide range of applications.

When a curvature radius of the image-side surface of the third lens element is R6, and a curvature radius of the object-side surface of the fourth lens element is R7, the following condition can be satisfied: −1.0<(R6+R7)/(R6−R7)<12.0. Therefore, adjusting the shapes on the image-side surface of the third lens element and the object-side surface of the fourth lens element is favorable for capturing incident light from large angle of view and correcting aberrations at the object side of the optical imaging lens system, so that the incident light is properly propagated through the optical imaging lens system. Preferably, the following condition can be satisfied: −0.8<(R6+R7)/(R6−R7)<8.0.

When a curvature radius of an image-side surface of the second lens element is R4, and a curvature radius of the object-side surface of the third lens element is R5, the following condition can be satisfied: (R4+R5)/(R4−R5)<−0.75. Therefore, adjusting the shapes on the image-side surface of the second lens element and the object-side surface of the third lens element is favorable for capturing incident light from large angle of view and reducing the total track length of the optical imaging lens system, and thereby meeting the requirements of wide angle effect and compactness. Preferably, the following condition can be satisfied: −13.0<(R4+R5)/(R4−R5)<−0.80.

Figure 25:
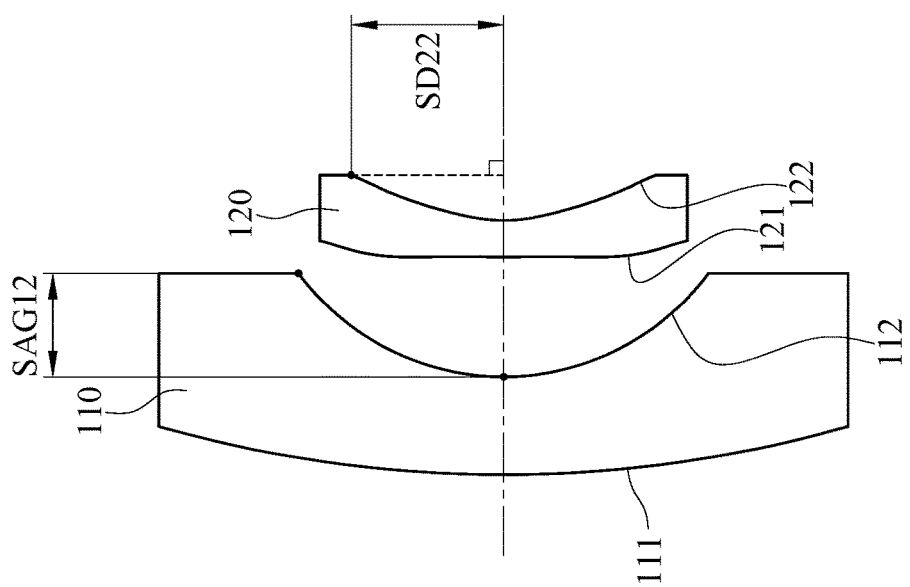
FIG. 25 shows a schematic view of SD22 and SAG12 according to the 1st embodiment of the present disclosure.

When the curvature radius of the image-side surface of the second lens element is R4, and a maximum effective radius of the image-side surface of the second lens element is SD22, the following condition can be satisfied: 0.05<R4/SD22<1.50. Therefore, controlling the shape on the image-side surface of the second lens element is favorable for the object side of the optical imaging lens system more flexible to design as well as improving the image quality. Preferably, the following condition can be satisfied: 0.05<R4/SD22<1.30. Please refer to FIG. 25, which shows a schematic view of SD22 according to the 1st embodiment of the present disclosure.

When a sum of central thicknesses of the six lens elements of the optical imaging lens system is ΣCT, and a sum of axial distances between each of the six adjacent lens elements of the optical imaging lens system is ΣAT, the following condition can be satisfied: 0.45<ΣCT/ΣAT<3.50. Therefore, it is favorable for properly arranging each lens element so as to obtain compactness and high assembling yield rate, and thereby increasing the manufacturing yield rate.

When a central thickness of the third lens element is CT3, and a central thickness of the fourth lens element is CT4, the following condition can be satisfied: 0.05<CT3/CT4<2.0. Therefore, a proper ratio of the central thickness of the third lens element to the central thickness of the fourth lens element is favorable for moderating the incident light from large angle of view and reducing the sensitivity so as to increase the manufacturing yield rate, and further correcting aberrations to improve the image quality.

When the central thickness of the third lens element is CT3, and the axial distance between the fifth lens element and the sixth lens element is T56, the following condition can be satisfied: 0<CT3/T56<2.90. Therefore, it is favorable for properly arranging the lens elements of the optical imaging lens system so as to increase assembling yield rate and improve the image quality. Preferably, the following condition can be satisfied: 0<CT3/T56<0.45.

When half of a maximum field of view of the optical imaging lens system is HFOV, the following condition can be satisfied: 1/|tan(HFOV)|<0.70. Therefore, it is favorable for enlarging the field of view for various applications When a refractive power of the second lens element is P2, a refractive power of the third lens element is P3, a refractive power of the fourth lens element is P4, a refractive power of the fifth lens element is P5, and a refractive power of the sixth lens element is P6, the following condition can be satisfied: 0<(|P2|+|P3|+|P4|+|P6|)/|P5|<3.0. Therefore, adjusting the refractive power distribution of the optical imaging lens system properly is favorable for increasing the capability of the lens elements for correcting aberrations and converging the light at the image side of the optical imaging lens system; moreover, it is favorable for obtaining high image quality and compactness for various applications. According to the present disclosure, a refractive power of a single lens element is a ratio of the focal length of the optical imaging lens system to the focal length of the single lens element.

When an Abbe number of the third lens element is V3, and an f-number of the optical imaging lens system is Fno, the following condition can be satisfied: 10<V3*Fno<60. Therefore, it is favorable for obtaining a balance between the size of the aperture stop and the material of the third lens element so that an imaging capturing unit including the optical imaging lens system is able to capture enough image information in low light condition (for example, in the night) or dynamic photography (for example, short exposure photography); furthermore, it is favorable for correcting chromatic aberrations so that the electronic device equipped with the imaging capturing unit can generate high quality image after image processing, and thereby being usable under various conditions. Preferably, the following condition can be satisfied: 15<V3*Fno<58.

When the focal length of the optical imaging lens system is f, and an entrance pupil diameter of the optical imaging lens system is EPD, the following condition can be satisfied: 0.70<f/EPD<2.40. Therefore, it is favorable for providing sufficient amount of incident light to increase illuminance on the image surface, so that the imaging capturing unit including the optical imaging lens system is able to capture enough image information in low light condition (for example, in the night) or dynamic photography (for example, short exposure photography), and thus an electronic device equipped with the imaging capturing unit can generate high quality image after image processing. As a result, the electronic device is able to be used under various conditions. Preferably, the following condition can be satisfied: 0.70<f/EPD<1.80.

According to the present disclosure, the optical imaging lens system is favorable for being operated within a wavelength range of 750 nanometers (nm) to 950 nm. When the optical imaging lens system is operated with a light source having a wavelength range of 750 nm to 950 nm, it is capable of detecting human body heat radiation. Therefore, the optical imaging lens system is capable of detecting user's iris, face, body movements and its relative position with respect to the surrounding environment without any disturbance from the background noise, and thereby capturing images having high quality, low noise and good recognition. In addition, the optical imaging lens system is also capable of measuring a distance between two objects.

Figure 26:
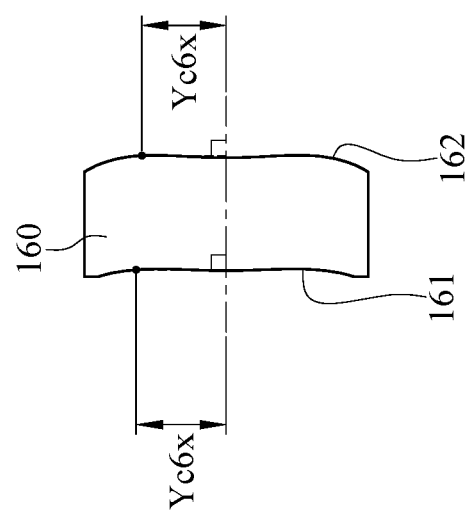
FIG. 26 shows a schematic view of Yc6x according to the 1st embodiment of the present disclosure.

According to the present disclosure, either the object-side surface of the sixth lens element, the image-side surface of the sixth lens element or both the object-side surface and the image-side surface of the sixth lens element can have at least one non-axial critical point. When the focal length of the optical imaging lens system is f, and a vertical distance between the non-axial critical point closest to an optical axis on any surface of the sixth lens element and the optical axis is Yc6x, the following condition can be satisfied: 0<Yc6x/f<1.80. Therefore, adjusting the shape of the sixth lens element is favorable for reducing the incident angle of light projecting onto the image surface so as to provide high illuminance and correct off-axial aberrations. Please refer to FIG. 26, which shows a schematic view of Yc6x according to the 1st embodiment of the present disclosure. According to the present disclosure, when any surface of the sixth lens element has single critical point, Yc6x is a vertical distance between the critical point and the optical axis; when any surface of the sixth lens element has a plurality of critical points, Yc6x is a vertical distance between one of the critical points, which is closest to the optical axis, and the optical axis.

According to the present disclosure, the optical imaging lens system further includes an aperture stop which can be located between the fourth lens element and the image surface. Therefore, adjusting the position of the aperture stop is favorable for obtaining wide angle effect and correcting aberrations.

When a focal length of the third lens element is f3, and a focal length of the sixth lens element is f6, the following condition can be satisfied: −0.70<f3/f6<5.0. Therefore, it is favorable for balancing the refractive power distribution between the third lens element and the sixth lens element so as to reduce the sensitivity and improve the image quality.

When an axial distance between the image-side surface of the sixth lens element and the image surface is BL, and the axial distance between the fifth lens element and the sixth lens element is T56, the following condition can be satisfied: 0<BL/T56<1.80. Therefore, it is favorable for properly adjusting the back focal length and the axial distance between the fifth lens element and the sixth lens element so as to reduce the total track length, such that the optical imaging lens system is applicable to compact devices.

When the curvature radius of the object-side surface of the fourth lens element is R7, and a curvature radius of the image-side surface of the fourth lens element is R8, the following condition can be satisfied: −0.45<R8/R7<3.0. Therefore, controlling the curvatures of the two surfaces of the fourth lens element are favorable for gathering incident light from large angle of view so as to correct astigmatism.

According to the present disclosure, at least one of the six lens elements of the optical imaging lens system can have an Abbe number smaller than 25. Therefore, it is favorable for selecting proper material for each lens element so as to prevent f-theta distortion due to wide field of view, and thereby preventing image distortion and increasing image resolution.

When the axial distance between the first lens element and the second lens element is T12, and the central thickness of the fifth lens element is CT5, the following condition can be satisfied: 0<T12/CT5<2.70. Therefore, it is favorable for reducing the total track length and increasing the light convergence capability at the image side of the optical imaging lens system so as to maintain compactness for various applications.

When the axial distance between the first lens element and the second lens element is T12, a central thickness of the second lens element is CT2, and a displacement in parallel with the optical axis from an axial vertex of an image-side surface of the first lens element to a maximum effective radius position of the image-side surface of the first lens element is SAG12, the following condition can be satisfied: |(T12+CT2)/SAG12|<1.80. Therefore, it is favorable for properly adjusting a relative position between the first lens element and the second lens element so as to obtain a wide angle lens configuration and good space utilization, and thereby achieving compactness. Preferably, the following condition can be satisfied: |(T12+CT2)/SAG12|<1.30. Please refer to FIG. 25, which shows a schematic view of SAG12 according to the 1st embodiment of the present disclosure. When the direction from the axial vertex of one surface to the maximum effective radius position of the same surface is facing towards the image side of the optical imaging lens system, the value of SAG12 is positive; when the direction from the axial vertex of the surface to the maximum effective radius position of the same surface is facing towards the object side of the optical imaging lens system, the value of SAG12 is negative.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an image surface of the optical imaging lens system, based on the corresponding image sensor, can be flat or curved, especially a curved surface being concave facing towards the object side of the optical imaging lens system.

According to the present disclosure, an image correction unit, such as a field flattener, can be optionally disposed between the lens element closest to the image-side of the optical imaging lens system and the image surface for correction of aberrations such as field curvature. The optical properties of the image correction unit, such as curvature, thickness, index of refraction, position and surface shape (convex or concave surface with spherical, aspheric, diffraction or Fresnel morphology), can be adjusted according to the demand of an image capturing unit. In general, a preferable image correction unit is, for example, a thin transparent element having a concave object-side surface and a planar image-side surface, and the thin transparent element is disposed near the image surface.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the optical imaging lens system can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the optical imaging lens system and thereby provides a wider field of view for the same.

According to the above description of the present disclosure, the following specific embodiments are provided for further explanation.

1st Embodiment

Figure 2:
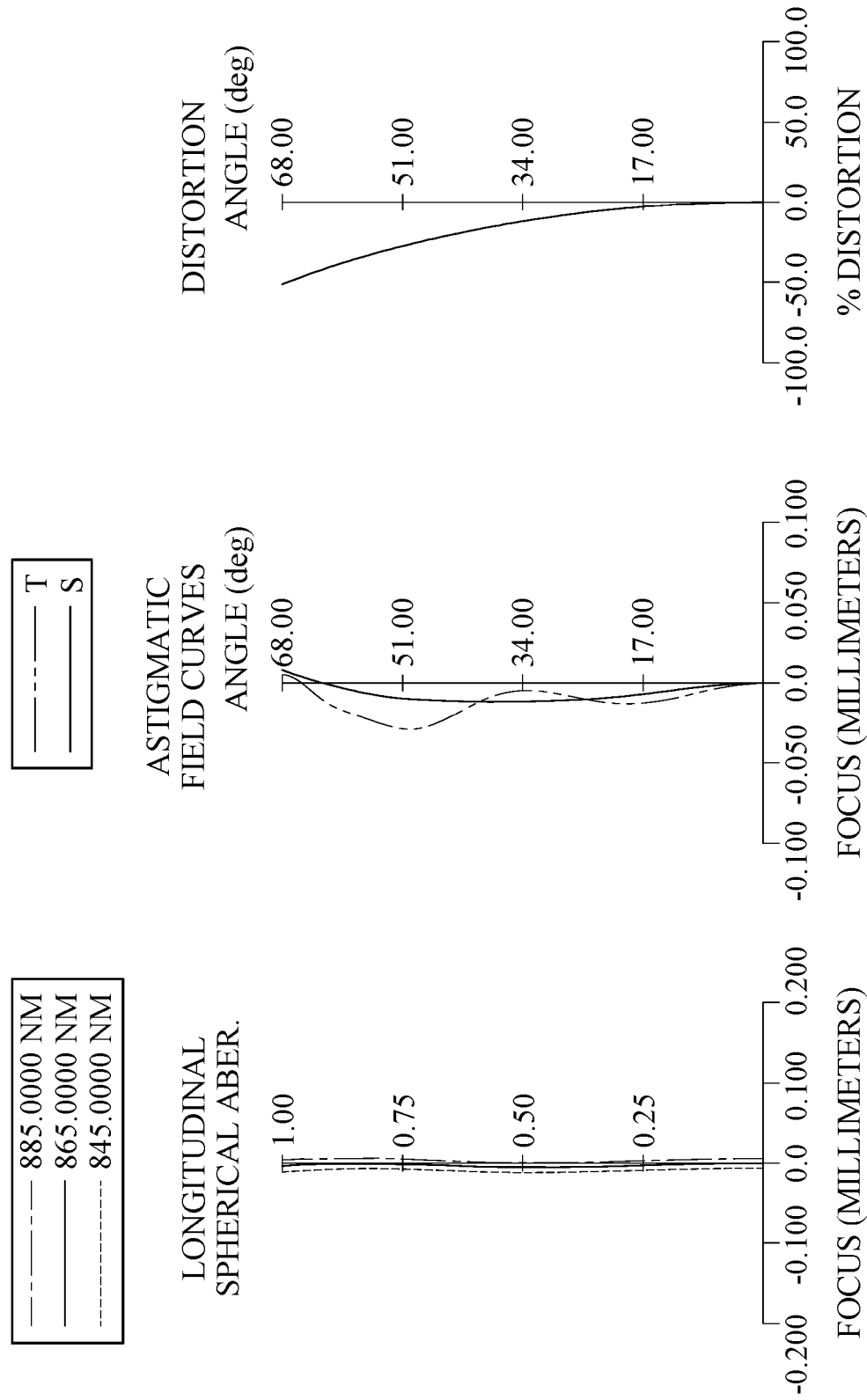
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens system (its reference numeral is omitted) of the present disclosure and an image sensor 190. The optical imaging lens system includes, in order from an object side to an image side, a first lens element 110, a second lens element 120, a third lens element 130, a fourth lens element 140, an aperture stop 100, a fifth lens element 150, a sixth lens element 160, a filter 170 and an image surface 180. The optical imaging lens system includes six lens elements (110, 120, 130, 140, 150, 160) with no additional lens element disposed between the first lens element 110 and the sixth lens element 160.

The first lens element 110 with negative refractive power has an object-side surface 111 being convex in a paraxial region thereof and an image-side surface 112 being concave in a paraxial region thereof. The first lens element 110 is made of glass and has the object-side surface 111 and the image-side surface 112 being both spherical.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 and the image-side surface 132 of the third lens element 130 each have at least one inflection point.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 and the image-side surface 162 of the sixth lens element 160 each have at least one non-axial critical point.

The filter 170 is made of glass and located between the sixth lens element 160 and the image surface 180, and will not affect the focal length of the optical imaging lens system. The image sensor 190 is disposed on or near the image surface 180 of the optical imaging lens system. In this embodiment, the optical imaging lens system is favorable for being operated within a wavelength of 865.0 nm.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=1.55 millimeters (mm); Fno=1.47; and HFOV=68.0 degrees (deg.).

When half of the maximum field of view of the optical imaging lens system is HFOV, the following condition is satisfied: 1/tan(HFOV)=0.40.

When an Abbe number of the third lens element 130 is V3, the f-number of the optical imaging lens system is Fno, the following condition is satisfied: V3*Fno=29.99.

When a central thickness of the third lens element 130 is CT3, a central thickness of the fourth lens element 140 is CT4, the following condition is satisfied: CT3/CT4=0.79.

When a central thickness of the fifth lens element 150 is CT5, a central thickness of the sixth lens element 160 is CT6, the following condition is satisfied: CT5/CT6=0.96.

When the central thickness of the third lens element 130 is CT3, an axial distance between the fifth lens element 150 and the sixth lens element 160 is T56, the following condition is satisfied: CT3/T56=0.29.

When an axial distance between the first lens element 110 and the second lens element 120 is T12, the central thickness of the fifth lens element 150 is CT5, the following condition is satisfied: T12/CT5=1.15.

When the axial distance between the first lens element 110 and the second lens element 120 is T12, an axial distance between the third lens element 130 and the fourth lens element 140 is T34, an axial distance between the fourth lens element 140 and the fifth lens element 150 is T45, the following condition is satisfied: (T12+T45)/T34=1.19.

When the axial distance between the first lens element 110 and the second lens element 120 is T12, a central thickness of the second lens element 120 is CT2, a displacement in parallel with the optical axis from an axial vertex of the image-side surface 112 of the first lens element 110 to a maximum effective radius position of the image-side surface 112 thereof is SAG12, the following condition is satisfied: |(T12+CT2)/SAG12|=1.51.

When an axial distance between the object-side surface 111 of the first lens element 110 and the image-side surface 162 of the sixth lens element 160 is TD, the central thickness of the fifth lens element 150 is CT5, the central thickness of the sixth lens element 160 is CT6, the axial distance between the fifth lens element 150 and the sixth lens element 160 is T56, the following condition is satisfied: TD/(CT5+T56+CT6)=2.52.

In the optical imaging lens system according to the 1st embodiment, when a central thickness of the first lens element 110 is CT1, the central thickness of the second lens element 120 is CT2, the central thickness of the third lens element 130 is CT3, the central thickness of the fourth lens element 140 is CT4, the central thickness of the fifth lens element 150 is CT5, the central thickness of the sixth lens element 160 is CT6, a sum of central thicknesses of the six lens elements of the optical imaging lens system is ΣCT (that is, ΣCT=CT1+CT2+CT3+CT4+CT5+CT6), the axial distance between the first lens element 110 and the second lens element 120 is T12, an axial distance between the second lens element 120 and the third lens element 130 is T23, the axial distance between the third lens element 130 and the fourth lens element 140 is T34, the axial distance between the fourth lens element 140 and the fifth lens element 150 is T45, the axial distance between the fifth lens element 150 and the sixth lens element 160 is T56, and a sum of axial distances between each of the six adjacent lens elements of the optical imaging lens system is ΣAT (that is, ΣAT=T12+T23+T34+T45+T56), the following condition is satisfied: ΣCT/ΣAT=1.04. In this embodiment, the axial distance between two adjacent lens elements is the air gap in a paraxial region between the two adjacent lens elements.

When a curvature radius of the image-side surface 122 of the second lens element 120 is R4, a curvature radius of the object-side surface 131 of the third lens element 130 is R5, the following condition is satisfied: (R4+R5)/(R4−R5)=−6.26.

When a curvature radius of the image-side surface 132 of the third lens element 130 is R6, a curvature radius of the object-side surface 141 of the fourth lens element 140 is R7, the following condition is satisfied: (R6+R7)/(R6−R7)=0.86.

When the curvature radius of the object-side surface 141 of the fourth lens element 140 is R7, a curvature radius of the image-side surface 142 of the fourth lens element 140 is R8, the following condition is satisfied: R8/R7=1.46.

When the curvature radius of the image-side surface 122 of the second lens element 120 is R4, a maximum effective radius of the image-side surface 122 of the second lens element 120 is SD22, the following condition is satisfied: R4/SD22=0.95.

When the focal length of the optical imaging lens system is f, the axial distance between the fifth lens element 150 and the sixth lens element 160 is T56, the following condition is satisfied: f/T56=0.99.

When the focal length of the optical imaging lens system is f, the axial distance between the third lens element 130 and the fourth lens element 140 is T34, the following condition is satisfied: f/T34=1.09.

When a focal length of the third lens element 130 is f3, a focal length of the sixth lens element 160 is f6, the following condition is satisfied: f3/f6=−0.12.

When the focal length of the optical imaging lens system is f, an entrance pupil diameter of the optical imaging lens system is EPD, the following condition is satisfied: f/EPD=1.47.

When an axial distance between the image-side surface 162 of the sixth lens element 160 and the image surface 180 is BL, the axial distance between the fifth lens element 150 and the sixth lens element 160 is T56, the following condition is satisfied: BL/T56=0.52.

When a refractive power of the second lens element 120 is P2, a refractive power of the third lens element 130 is P3, a refractive power of the fourth lens element 140 is P4, a refractive power of the fifth lens element 150 is P5, a refractive power of the sixth lens element 160 is P6, the following condition is satisfied: (|P2|+|P3|+|P4|+|P6|)/|P5|=1.50.

When the focal length of the optical imaging lens system is f, a vertical distance between the non-axial critical point closest to the optical axis on any surface of the sixth lens element 160 and the optical axis is Yc6x, a vertical distance between the non-axial critical point closest to the optical axis on the object-side surface 161 of the sixth lens element 160 and the optical axis is Yc61, the following condition is satisfied: Yc61/f=0.58, wherein Yc6x=Yc61.

When the focal length of the optical imaging lens system is f, the vertical distance between the non-axial critical point closest to the optical axis on any surface of the sixth lens element 160 and the optical axis is Yc6x, a vertical distance between the non-axial critical point closest to the optical axis on the image-side surface 162 of the sixth lens element 160 and the optical axis is Yc62, the following condition is satisfied: Yc62/f=0.61, wherein Yc6x=Yc62.

The detailed optical data of the 1st embodiment are shown in Table 1 and the aspheric surface data are shown in Table 2 below.

TABLE 1

1st Embodiment
f = 1.55 mm, Fno = 1.47, HFOV = 68.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 17.183 | | 1.327 | Glass | 1.771 | 43.9 | −5.85 |
| 2 | | 3.451 | | 1.637 | | | | |
| 3 | Lens 2 | 22.525 | (ASP) | 0.493 | Plastic | 1.536 | 55.9 | −4.04 |
| 4 | | 1.960 | (ASP) | 0.845 | | | | |
| 5 | Lens 3 | 2.705 | (ASP) | 0.460 | Plastic | 1.637 | 20.4 | 4.84 |
| 6 | | 20.544 | (ASP) | 1.428 | | | | |
| 7 | Lens 4 | −1.490 | (ASP) | 0.582 | Plastic | 1.536 | 55.9 | −12.68 |
| 8 | | −2.169 | (ASP) | −0.135 | | | | |
| 9 | Ape. Stop | Plano | | 0.204 | | | | |
| 10 | Lens 5 | 2.754 | (ASP) | 1.429 | Plastic | 1.619 | 23.5 | 2.68 |
| 11 | | −3.340 | (ASP) | 1.566 | | | | |
| 12 | Lens 6 | 8.398 | (ASP) | 1.493 | Plastic | 1.619 | 23.3 | −39.47 |
| 13 | | 5.824 | (ASP) | 0.300 | | | | |
| 14 | Filter | Plano | | 0.200 | Glass | 1.517 | 64.2 | — |
| 15 | | Plano | | 0.311 | | | | |
| 16 | Image | Plano | | — | | | | |

Note:
Reference wavelength is 865.0 nm.

TABLE 2

Aspheric Coefficients

| | Surface # | | | | |
|---|---|---|---|---|---|
| | 3 | 4 | 5 | 6 | 7 |
| k = | −4.1181E+00 | −3.1324E+00 | −4.5190E+00 | 5.5834E+01 | −4.9576E−01 |
| A4 = | −4.0784E−02 | −6.2406E−02 | −1.8082E−02 | −1.1427E−02 | 1.2222E−01 |
| A6 = | 2.5304E−02 | 3.2654E−02 | −3.1486E−02 | −1.7780E−02 | −9.8368E−02 |
| A8 = | −7.2106E−03 | −1.0050E−02 | 8.2836E−03 | 4.6538E−03 | 7.0601E−02 |
| A10 = | 1.2653E−03 | 2.8497E−03 | 1.1642E−03 | 8.1991E−04 | −3.6301E−02 |
| A12 = | −1.2484E−04 | −5.6898E−04 | −4.7918E−04 | −1.9275E−04 | 1.1079E−02 |
| A14 = | 5.0246E−06 | 4.5851E−05 | 3.3148E−05 | — | −1.3195E−03 |

| | Surface # | | | | |
|---|---|---|---|---|---|
| | 8 | 10 | 11 | 12 | 13 |
| k = | −2.5796E+00 | −3.0039E+00 | −7.7049E−01 | 7.0839E+00 | 1.6052E+00 |
| A4 = | −6.3781E−03 | −4.4136E−02 | −1.6306E−02 | −5.3749E−02 | −7.6762E−02 |
| A6 = | −1.6380E−02 | 2.1524E−02 | 5.3716E−03 | 2.5257E−02 | 3.6102E−02 |
| A8 = | 1.4153E−02 | −9.7066E−03 | −4.8532E−03 | −1.6539E−02 | −1.6682E−02 |
| A10 = | −5.6254E−03 | 3.2697E−03 | 3.1046E−03 | 3.4772E−03 | 2.4954E−03 |
| A12 = | 1.1038E−03 | −4.8148E−04 | −9.1307E−04 | 1.8494E−03 | 8.5346E−04 |
| A14 = | 3.7314E−05 | 2.7030E−05 | 1.1444E−04 | −9.7772E−04 | −3.5115E−04 |
| A16 = | — | — | — | 1.2038E−04 | 3.4033E−05 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
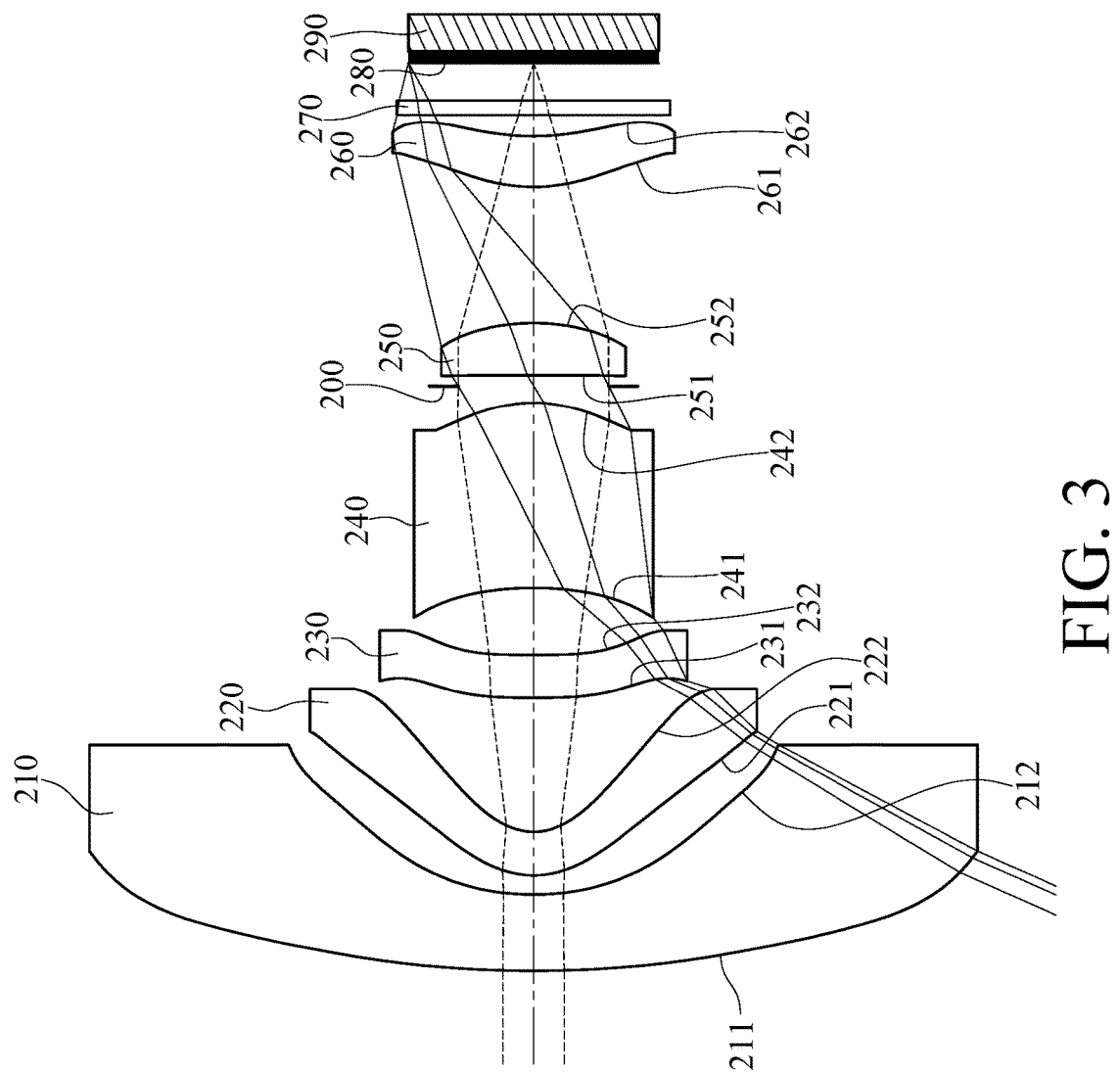
FIG. 3 is a schematic view of an image capturing unit according to the 2nd embodiment of the present disclosure.
Figure 4:
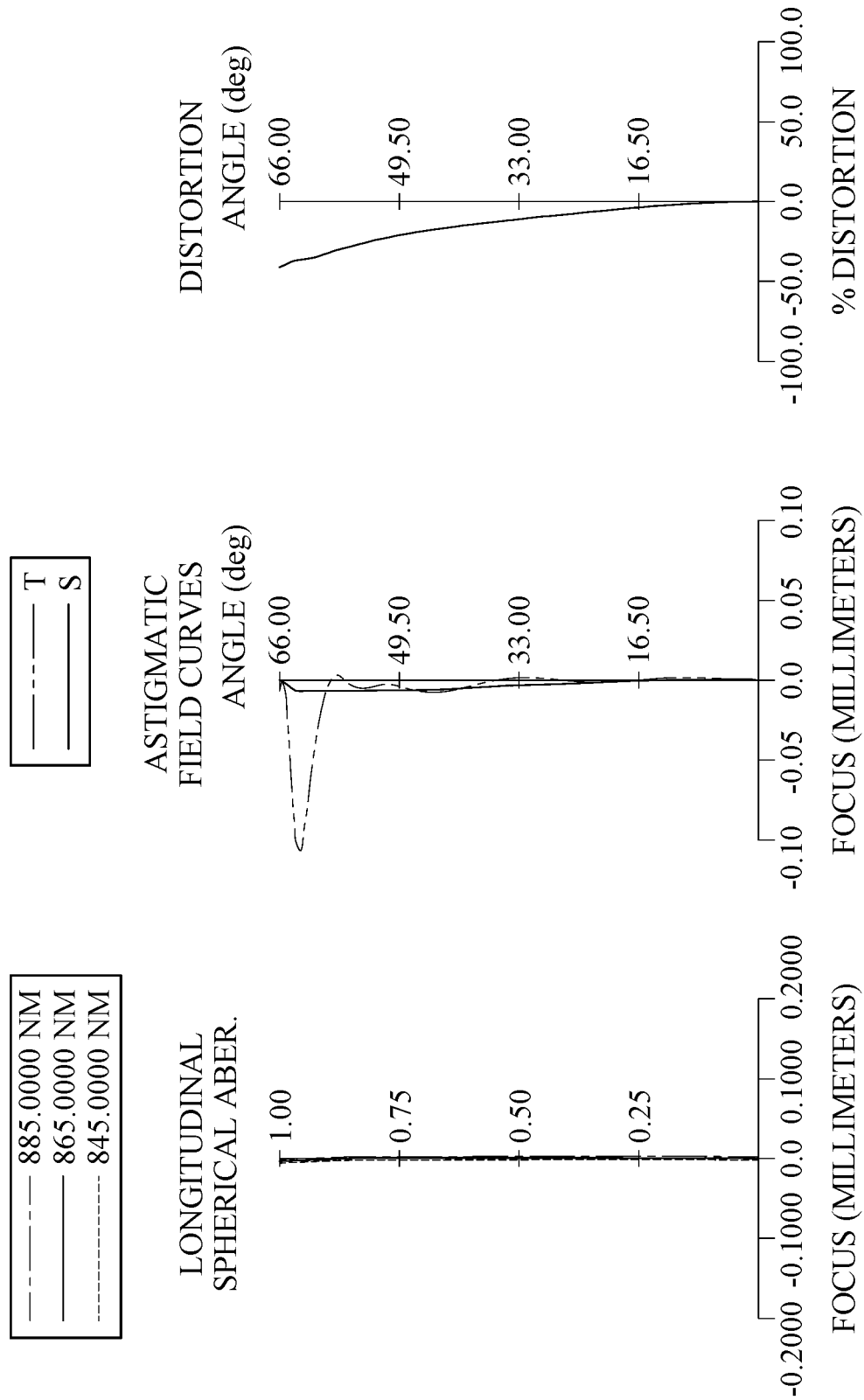
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens system (its reference numeral is omitted) of the present disclosure and an image sensor 290. The optical imaging lens system includes, in order from an object side to an image side, a first lens element 210, a second lens element 220, a third lens element 230, a fourth lens element 240, an aperture stop 200, a fifth lens element 250, a sixth lens element 260, a filter 270 and an image surface 280. The optical imaging lens system includes six lens elements (210, 220, 230, 240, 250, 260) with no additional lens element disposed between the first lens element 210 and the sixth lens element 260.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 and the image-side surface 232 of the third lens element 230 each have at least one inflection point.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 and the image-side surface 262 of the sixth lens element 260 each have at least one non-axial critical point.

The filter 270 is made of glass and located between the sixth lens element 260 and the image surface 280, and will not affect the focal length of the optical imaging lens system. The image sensor 290 is disposed on or near the image surface 280 of the optical imaging lens system. In this embodiment, the optical imaging lens system is favorable for being operated within a wavelength of 865.0 nm.

The detailed optical data of the 2nd embodiment are shown in Table 3 and the aspheric surface data are shown in Table 4 below.

TABLE 3

2nd Embodiment
f = 1.36 mm, Fno = 1.60, HFOV = 66.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.808 | (ASP) | 1.056 | Plastic | 1.537 | 56.0 | −9.01 |
| 2 | | 3.618 | (ASP) | 0.265 | | | | |
| 3 | Lens 2 | 1.278 | (ASP) | 0.603 | Plastic | 1.536 | 55.9 | −7.73 |
| 4 | | 0.816 | (ASP) | 1.858 | | | | |
| 5 | Lens 3 | 20.930 | (ASP) | 0.602 | Plastic | 1.646 | 19.3 | 41.53 |
| 6 | | 94.151 | (ASP) | 0.929 | | | | |
| 7 | Lens 4 | −4.822 | (ASP) | 2.573 | Plastic | 1.536 | 55.9 | 4.47 |
| 8 | | −1.899 | (ASP) | 0.231 | | | | |
| 9 | Ape. Stop | Plano | | 0.154 | | | | |
| 10 | Lens 5 | −32.258 | (ASP) | 0.722 | Plastic | 1.536 | 55.9 | 6.40 |
| 11 | | −3.126 | (ASP) | 1.884 | | | | |
| 12 | Lens 6 | 2.264 | (ASP) | 0.705 | Plastic | 1.527 | 56.3 | 11.23 |
| 13 | | 3.273 | (ASP) | 0.300 | | | | |
| 14 | Filter | Plano | | 0.200 | Glass | 1.517 | 64.2 | — |
| 15 | | Plano | | 0.519 | | | | |
| 16 | Image | Plano | | — | | | | |

Note:
Reference wavelength is 865.0 nm.

TABLE 4

Aspheric Coefficients

| Surface # | 1 | 2 | 3 | 4 | 5 | 6 |
|---|---|---|---|---|---|---|
| k = | 3.1644E+00 | 2.8526E−02 | −2.0289E+00 | −1.2165E+00 | −6.8330E+01 | −9.0000E+01 |
| A4 = | 2.1186E−04 | 3.3533E−03 | 5.8830E−02 | 7.0016E−02 | 1.6200E+00 | 9.2228E−02 |
| A6 = | −3.9888E−05 | 1.2858E−03 | −3.5567E−02 | −8.0697E−02 | −3.5780E+00 | −3.4798E−02 |
| A8 = | 9.4378E−07 | −3.4510E−04 | 9.3571E−03 | 3.2038E−02 | 6.7347E+00 | 1.2856E−02 |
| A10 = | 1.0495E−09 | 1.6270E−05 | −1.3119E−03 | −6.4347E−03 | −9.9561E+00 | −2.5077E−03 |
| A12 = | — | — | 9.5326E−05 | 6.2997E−04 | 7.2618E+00 | −3.4336E−04 |
| A14 = | — | — | −2.8128E−06 | −2.3914E−05 | −1.9352E+00 | 1.0995E−04 |

| Surface # | 7 | 8 | 10 | 11 | 12 | 13 |
|---|---|---|---|---|---|---|
| k = | 2.0192E+00 | −4.0025E+00 | −9.0000E+01 | −5.6999E−01 | −8.5790E−01 | −3.1677E+00 |
| A4 = | −3.5987E−03 | −1.0342E−02 | 3.1116E−02 | −2.2022E−02 | −3.1057E−02 | −4.1709E−02 |
| A6 = | −1.3226E−02 | 7.8995E−06 | −2.5378E−02 | −1.4695E−03 | 1.2306E−02 | 5.4677E−02 |
| A8 = | 8.1467E−03 | 1.5804E−03 | 1.9459E−03 | 7.8563E−04 | −1.2716E−02 | −4.5536E−02 |
| A10 = | −3.3854E−03 | 1.2301E−04 | 5.7191E−03 | −4.7651E−04 | 4.7772E−03 | 1.6602E−02 |
| A12 = | 9.1996E−04 | 1.5491E−05 | −2.5514E−03 | −6.2783E−05 | −5.8720E−04 | −2.8577E−03 |
| A14 = | −1.0199E−04 | 2.5707E−06 | — | — | 1.1111E−06 | 1.8446E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.36 | (R4 + R5)/(R4 − R5) | −1.08 |
| Fno | 1.60 | (R6 + R7)/(R6 − R7) | 0.90 |
| HFOV [deg.] | 66.0 | R8/R7 | 0.39 |
| 1/tan (HFOV) | 0.45 | R4/SD22 | 0.33 |
| V3 * Fno | 30.88 | f/T56 | 0.72 |
| CT3/CT4 | 0.23 | f/T34 | 1.47 |
| CT5/CT6 | 1.02 | f3/f6 | 3.70 |
| CT3/T56 | 0.32 | f/EPD | 1.60 |
| T12/CT5 | 0.37 | BL/T56 | 0.54 |
| (T12 + T45)/T34 | 0.70 | (|P2| + |P3| + |P4| + |P6|)/|P5| | 2.99 |
| |(T12 + CT2)/SAG12| | 0.42 | Yc61/f | 1.40 |
| TD/(CT5 + T56 + CT6) | 3.50 | Yc62/f | 1.11 |
| ΣCT/ΣAT | 1.18 | — | |

3rd Embodiment

Figure 5:
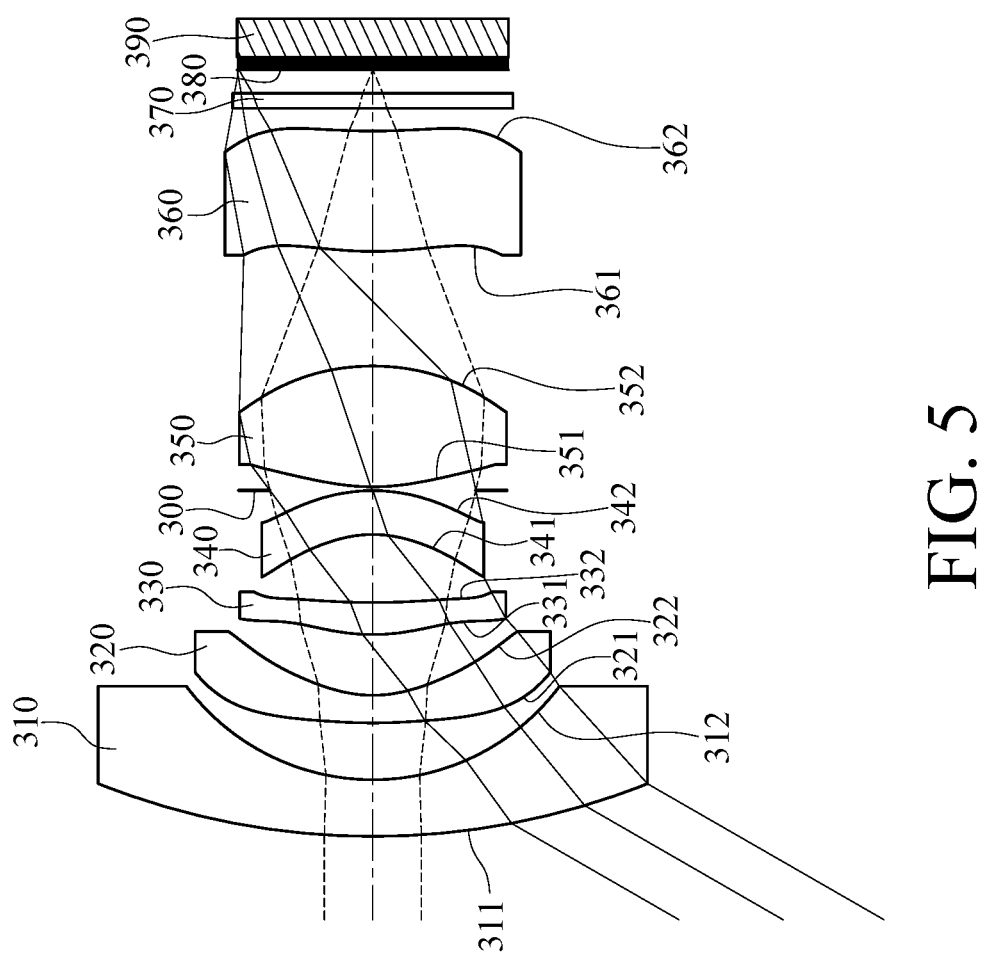
FIG. 5 is a schematic view of an image capturing unit according to the 3rd embodiment of the present disclosure.
Figure 6:
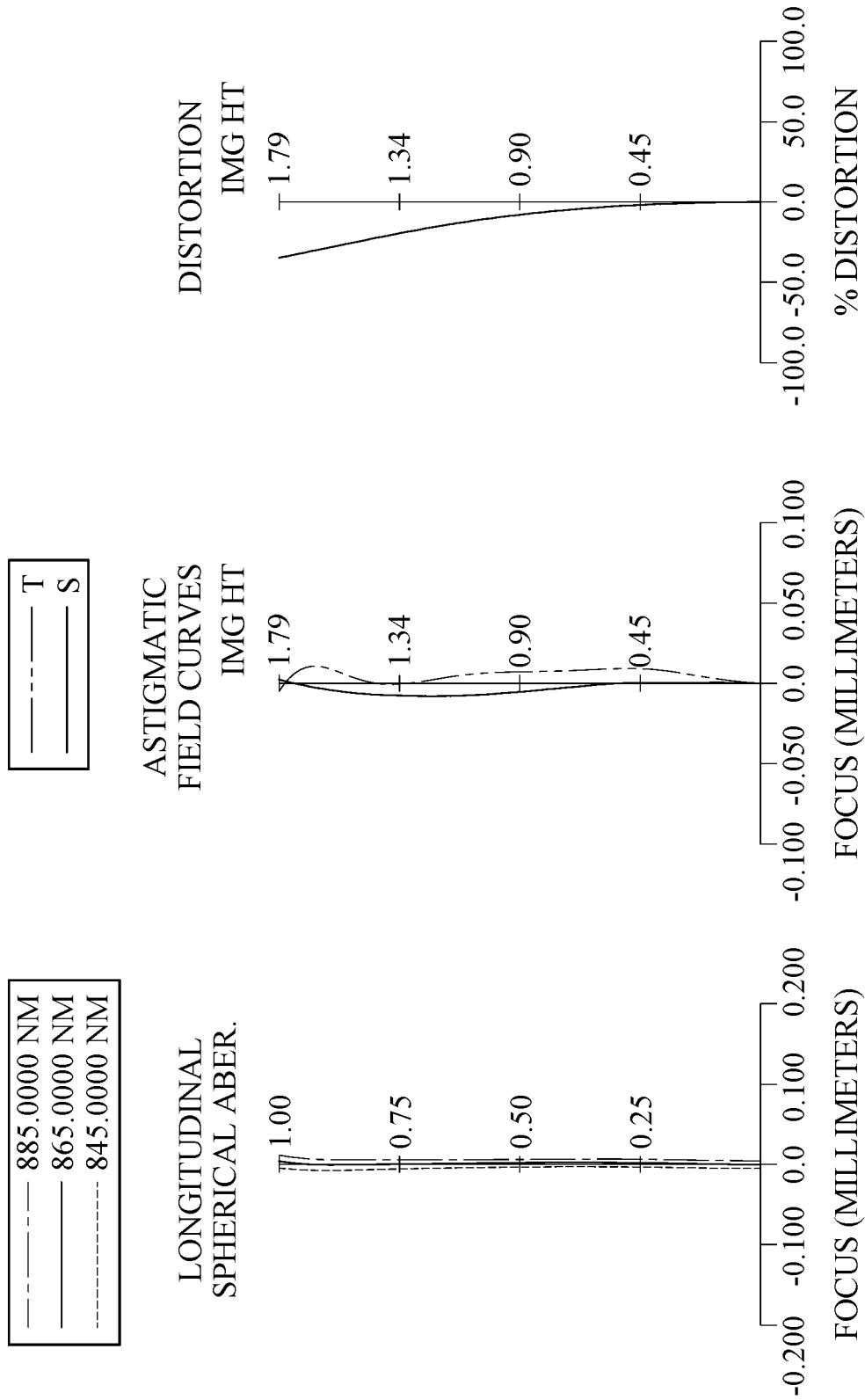
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens system (its reference numeral is omitted) of the present disclosure and an image sensor 390. The optical imaging lens system includes, in order from an object side to an image side, a first lens element 310, a second lens element 320, a third lens element 330, a fourth lens element 340, an aperture stop 300, a fifth lens element 350, a sixth lens element 360, a filter 370 and an image surface 380. The optical imaging lens system includes six lens elements (310, 320, 330, 340, 350, 360) with no additional lens element disposed between the first lens element 310 and the sixth lens element 360.

The first lens element 310 with negative refractive power has an object-side surface 311 being convex in a paraxial region thereof and an image-side surface 312 being concave in a paraxial region thereof. The first lens element 310 is made of glass and has the object-side surface 311 and the image-side surface 312 being both spherical.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 and the image-side surface 332 of the third lens element 330 each have at least one inflection point.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 and the image-side surface 362 of the sixth lens element 360 each have at least one non-axial critical point.

The filter 370 is made of glass and located between the sixth lens element 360 and the image surface 380, and will not affect the focal length of the optical imaging lens system. The image sensor 390 is disposed on or near the image surface 380 of the optical imaging lens system. In this embodiment, the optical imaging lens system is favorable for being operated within a wavelength of 865.0 nm.

The detailed optical data of the 3rd embodiment are shown in Table 5 and the aspheric surface data are shown in Table 6 below.

TABLE 5

3rd Embodiment
f = 1.63 mm, Fno = 1.27, HFOV = 60.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.781 | | 0.750 | Glass | 1.790 | 46.5 | −5.98 |
| 2 | | 3.077 | | 0.753 | | | | |
| 3 | Lens 2 | 6.403 | (ASP) | 0.365 | Plastic | 1.536 | 55.9 | −4.13 |
| 4 | | 1.613 | (ASP) | 0.804 | | | | |
| 5 | Lens 3 | 2.629 | (ASP) | 0.424 | Plastic | 1.637 | 20.4 | 5.50 |
| 6 | | 9.917 | (ASP) | 0.900 | | | | |
| 7 | Lens 4 | −1.530 | (ASP) | 0.580 | Plastic | 1.637 | 20.4 | −11.07 |
| 8 | | −2.243 | (ASP) | 0.004 | | | | |
| 9 | Ape. Stop | Plano | | 0.046 | | | | |
| 10 | Lens 5 | 2.775 | (ASP) | 1.598 | Plastic | 1.619 | 23.3 | 2.61 |
| 11 | | −3.018 | (ASP) | 1.517 | | | | |
| 12 | Lens 6 | 4.827 | (ASP) | 1.592 | Plastic | 1.619 | 23.3 | 15.28 |
| 13 | | 8.620 | (ASP) | 0.300 | | | | |
| 14 | Filter | Plano | | 0.200 | Glass | 1.517 | 64.2 | — |
| 15 | | Plano | | 0.308 | | | | |
| 16 | Image | Plano | | — | | | | |

Note:
Reference wavelength is 865.0 nm.

TABLE 6

Aspheric Coefficients

| Surface # | | | | | |
|---|---|---|---|---|---|
| | 3 | 4 | 5 | 6 | 7 |
| k = | −9.0000E+01 | −1.3836E+00 | −5.3579E+00 | −9.0000E+01 | −2.2123E−01 |
| A4 = | −7.7547E−03 | −7.2248E−02 | 1.0883E−03 | 2.4047E−02 | 1.2449E−01 |
| A6 = | 1.0848E−02 | 4.7393E−02 | −1.6036E−02 | −3.0331E−02 | −9.6481E−02 |
| A8 = | −2.4779E−03 | −2.1791E−02 | −2.1441E−02 | 3.0567E−03 | 7.4049E−02 |
| A10 = | 2.5913E−04 | 7.5640E−03 | 1.8449E−02 | 4.9548E−03 | −3.5930E−02 |
| A12 = | 8.0366E−06 | −1.4667E−03 | −4.6558E−03 | −9.0221E−04 | 1.0905E−02 |
| A14 = | −2.3076E−06 | 1.0757E−04 | 3.9025E−04 | — | −1.2876E−03 |

| Surface # | | | | |
|---|---|---|---|---|
| | 8 | 10 | 11 | 12 | 13 |
| k = | −2.8163E+00 | −3.6001E+00 | −9.0306E−01 | −1.1393E+00 | 5.8206E+00 |
| A4 = | −8.3454E−03 | −4.2019E−02 | −1.5899E−02 | −3.0200E−02 | −1.2138E−02 |
| A6 = | −1.6167E−02 | 2.3349E−02 | 6.6461E−03 | −1.8788E−03 | −1.3020E−02 |
| A8 = | 1.5427E−02 | −1.0547E−02 | −5.9921E−03 | −3.3176E−03 | −5.3708E−04 |
| A10 = | −5.6225E−03 | 3.1489E−03 | 3.2241E−03 | 2.8780E−03 | 1.4522E−03 |
| A12 = | 7.3441E−04 | −4.8879E−04 | −9.0053E−04 | −1.5009E−03 | −2.7073E−04 |
| A14 = | 1.8583E−04 | 3.9151E−05 | 1.0713E−04 | 3.9619E−04 | 9.4502E−06 |
| A16 = | — | — | — | −3.8631E−05 | 8.8666E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.63 | (R4 + R5)/(R4 − R5) | −4.18 |
| Fno | 1.27 | (R6 + R7)/(R6 − R7) | 0.73 |
| HFOV [deg.] | 60.1 | R8/R7 | 1.47 |
| 1/tan(HFOV) | 0.58 | R4/SD22 | 0.84 |
| V3 * Fno | 25.91 | f/T56 | 1.07 |

-continued

| 3rd Embodiment | | | |
|---|---|---|---|
| CT3/CT4 | 0.73 | f/T34 | 1.81 |
| CT5/CT6 | 1.00 | f3/f6 | 0.36 |
| CT3/T56 | 0.28 | f/EPD | 1.27 |
| T12/CT5 | 0.47 | BL/T56 | 0.53 |
| (T12 + T45)/T34 | 0.89 | (|P2| + |P3| + |P4| + |P6|)/|P5| | 1.51 |
| |(T12 + CT2)/SAG12| | 0.90 | Yc61/f | 0.72 |

-continued

| 3rd Embodiment | | | |
|---|---|---|---|
| TD/(CT5 + T56 + CT6) | 1.98 | Yc62/f | 0.62 |
| ΣCT/ΣAT | 1.32 | — | — |

4th Embodiment

Figure 7:
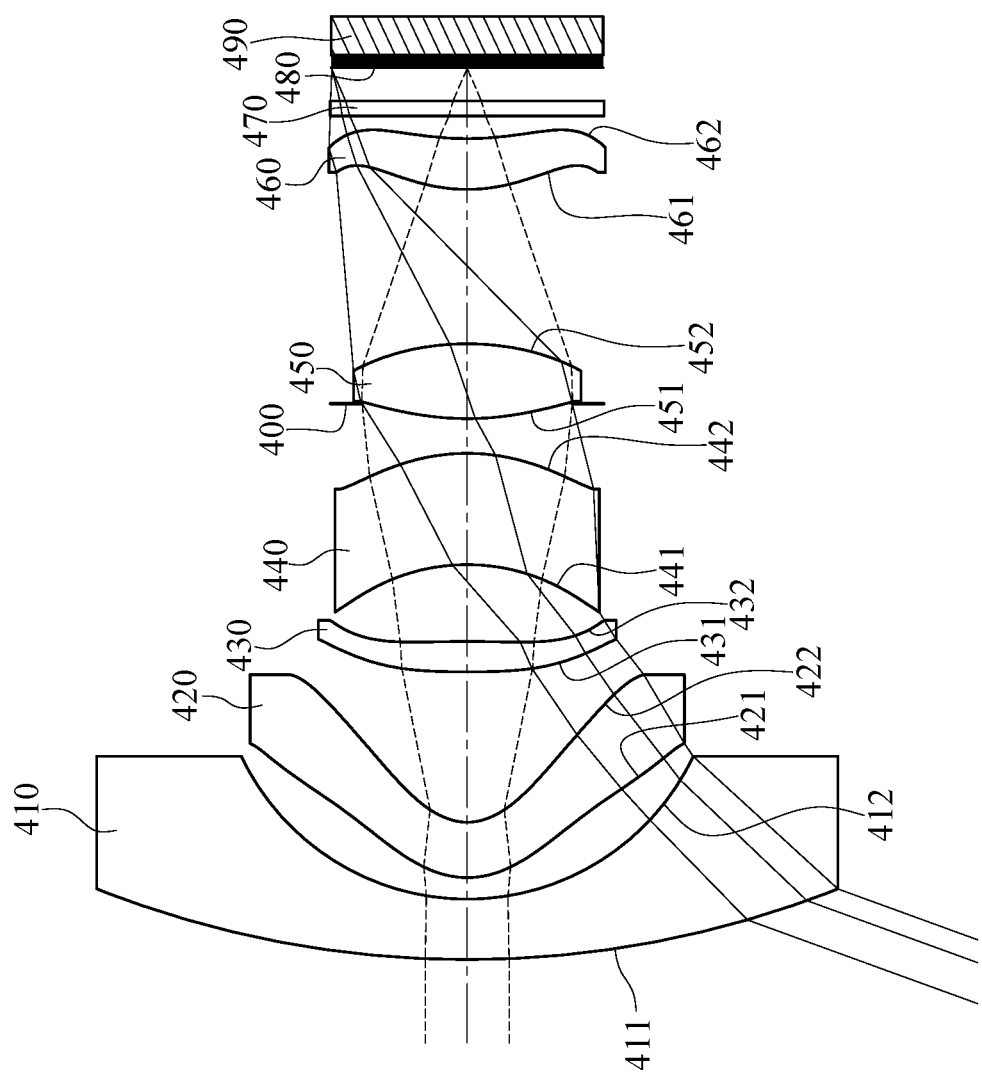
FIG. 7 is a schematic view of an image capturing unit according to the 4th embodiment of the present disclosure.
Figure 8:
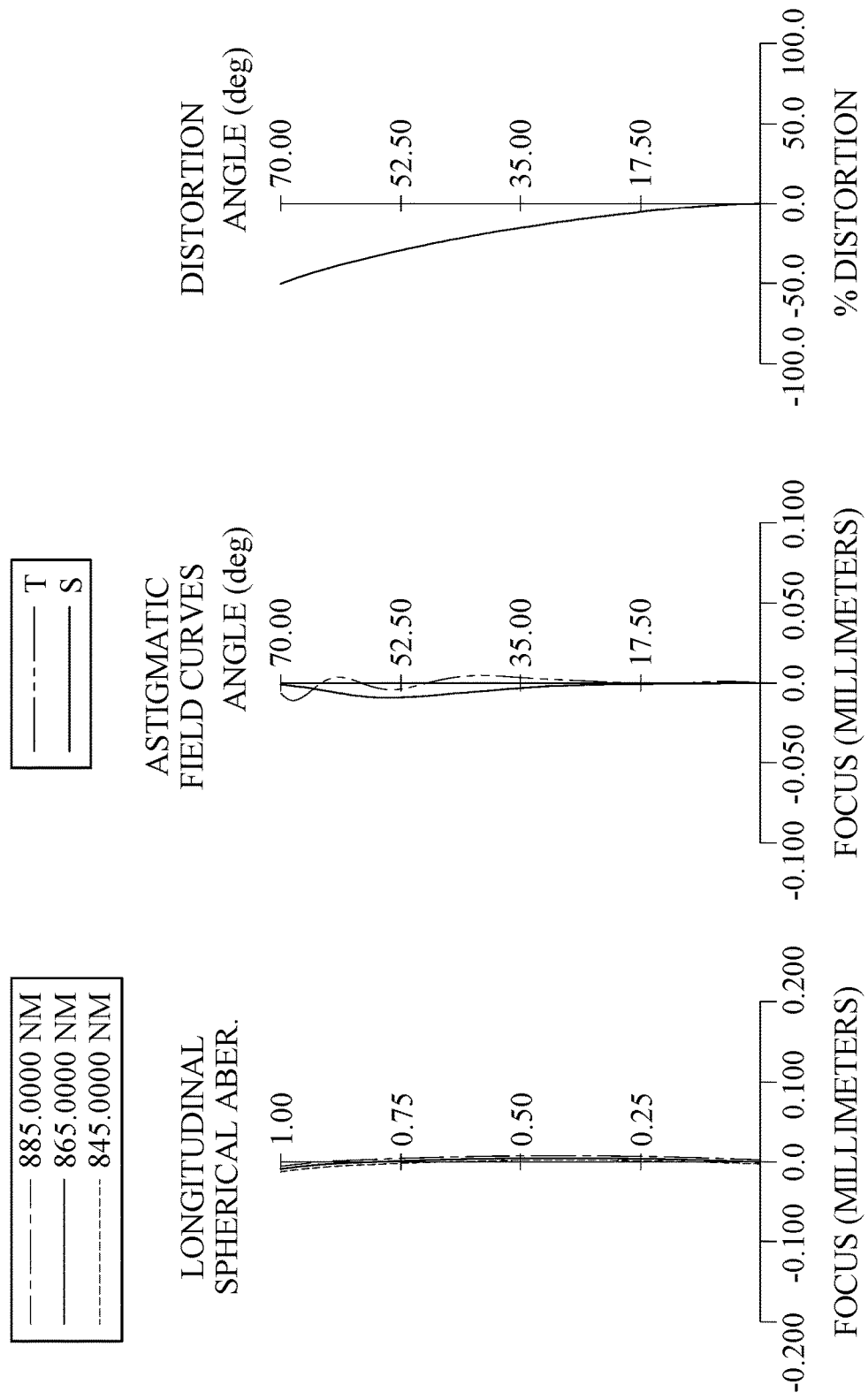
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens system (its reference numeral is omitted) of the present disclosure and an image sensor 490. The optical imaging lens system includes, in order from an object side to an image side, a first lens element 410, a second lens element 420, a third lens element 430, a fourth lens element 440, an aperture stop 400, a fifth lens element 450, a sixth lens element 460, a filter 470 and an image surface 480. The optical imaging lens system includes six lens elements (410, 420, 430, 440, 450, 460) with no additional lens element disposed between the first lens element 410 and the sixth lens element 460.

The first lens element 410 with negative refractive power has an object-side surface 411 being convex in a paraxial region thereof and an image-side surface 412 being concave in a paraxial region thereof. The first lens element 410 is made of glass and has the object-side surface 411 and the image-side surface 412 being both spherical.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The object-side surface 431 and the image-side surface 432 of the third lens element 430 each have at least one inflection point.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 and the image-side surface 462 of the sixth lens element 460 each have at least one non-axial critical point.

The filter 470 is made of glass and located between the sixth lens element 460 and the image surface 480, and will not affect the focal length of the optical imaging lens system. The image sensor 490 is disposed on or near the image surface 480 of the optical imaging lens system. In this embodiment, the optical imaging lens system is favorable for being operated within a wavelength of 865.0 nm.

The detailed optical data of the 4th embodiment are shown in Table 7 and the aspheric surface data are shown in Table 8 below.

TABLE 7

4th Embodiment
f = 1.38 mm, Fno = 1.25, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.276 | | 0.800 | Glass | 1.716 | 54.8 | −6.36 |
| 2 | | 3.305 | | 0.286 | | | | |
| 3 | Lens 2 | 1.148 | (ASP) | 0.733 | Plastic | 1.538 | 56.0 | −8.60 |
| 4 | | 0.714 | (ASP) | 1.988 | | | | |
| 5 | Lens 3 | 12.442 | (ASP) | 0.403 | Plastic | 1.641 | 20.4 | 9.84 |
| 6 | | −12.626 | (ASP) | 1.016 | | | | |
| 7 | Lens 4 | −2.630 | (ASP) | 1.473 | Plastic | 1.538 | 56.0 | 27.08 |
| 8 | | −2.664 | (ASP) | 0.658 | | | | |
| 9 | Ape. Stop | Plano | | −0.199 | | | | |
| 10 | Lens 5 | 3.785 | (ASP) | 0.989 | Plastic | 1.538 | 56.0 | 3.63 |
| 11 | | −3.658 | (ASP) | 2.043 | | | | |
| 12 | Lens 6 | 2.175 | (ASP) | 0.672 | Plastic | 1.538 | 55.3 | 8.41 |
| 13 | | 3.736 | (ASP) | 0.300 | | | | |
| 14 | Filter | Plano | | 0.200 | Glass | 1.517 | 64.2 | — |
| 15 | | Plano | | 0.437 | | | | |
| 16 | Image | Plano | | — | | | | |

Note:
Reference wavelength is 865.0 nm.

TABLE 8

Aspheric Coefficients

| Surface # | 3 | 4 | 5 | 6 | 7 |
|---|---|---|---|---|---|
| k = | −2.1642E+00 | −1.3123E+00 | 1.9957E+01 | −9.0000E+01 | −9.8957E−02 |
| A4 = | 7.7162E−02 | 6.7716E−02 | 2.3556E−02 | 2.9007E−02 | 5.3469E−03 |
| A6 = | −4.9393E−02 | −6.9346E−02 | 1.4483E−02 | 1.5527E−02 | −1.1028E−02 |
| A8 = | 1.3056E−02 | 2.3870E−02 | −1.3580E−02 | −1.3729E−02 | 8.0427E−03 |
| A10 = | −1.8239E−03 | −3.9456E−03 | 4.5810E−03 | 4.8900E−03 | −3.4639E−03 |
| A12 = | 1.3563E−04 | 2.8336E−04 | −7.1314E−04 | −6.1502E−04 | 9.1633E−04 |
| A14 = | −4.2791E−06 | −5.7545E−06 | 4.0169E−05 | 3.5756E−06 | −9.4327E−05 |

| Surface # | 8 | 10 | 11 | 12 | 13 |
|---|---|---|---|---|---|
| k = | −1.7812E+00 | −4.7688E−01 | −3.1846E+00 | −1.6066E+00 | 2.2528E+00 |
| A4 = | −7.3527E−03 | −1.1218E−02 | −1.6292E−02 | −2.3087E−02 | −6.8319E−02 |
| A6 = | 1.3629E−03 | 2.2535E−03 | 2.4631E−03 | 1.4348E−02 | 5.6377E−02 |
| A8 = | 7.9789E−04 | −1.4942E−03 | −1.3172E−03 | −1.3169E−02 | −4.7620E−02 |
| A10 = | −1.8110E−04 | 4.7584E−04 | 4.6925E−04 | 3.2006E−03 | 1.6642E−02 |
| A12 = | −1.7417E−05 | −7.7404E−05 | −8.5140E−05 | −6.9579E−04 | −2.7903E−03 |
| A14 = | 2.6177E−05 | — | — | 9.3602E−05 | 1.7577E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.38 | (R4 + R5)/(R4 − R5) | −1.12 |
| Fno | 1.25 | (R6 + R7)/(R6 − R7) | 1.53 |
| HFOV [deg.] | 70.0 | R8/R7 | 1.01 |
| 1/tan (HFOV) | 0.36 | R4/SD22 | 0.31 |
| V3 * Fno | 25.50 | f/T56 | 0.68 |
| CT3/CT4 | 0.27 | f/T34 | 1.36 |
| CT5/CT6 | 1.47 | f3/f6 | 1.17 |
| CT3/T56 | 0.20 | f/EPD | 1.25 |
| T12/CT5 | 0.29 | BL/T56 | 0.46 |
| (T12 + T45)/T34 | 0.73 | (|P2| + |P3| + |P4| + |P6|)/|P5| | 1.36 |
| |(T12 + CT2)/SAG12| | 0.54 | Yc61/f | 1.05 |
| TD/(CT5 + T56 + CT6) | 2.93 | Yc62/f | 0.90 |
| ΣCT/ΣAT | 0.88 | — | — |

5th Embodiment

Figure 9:
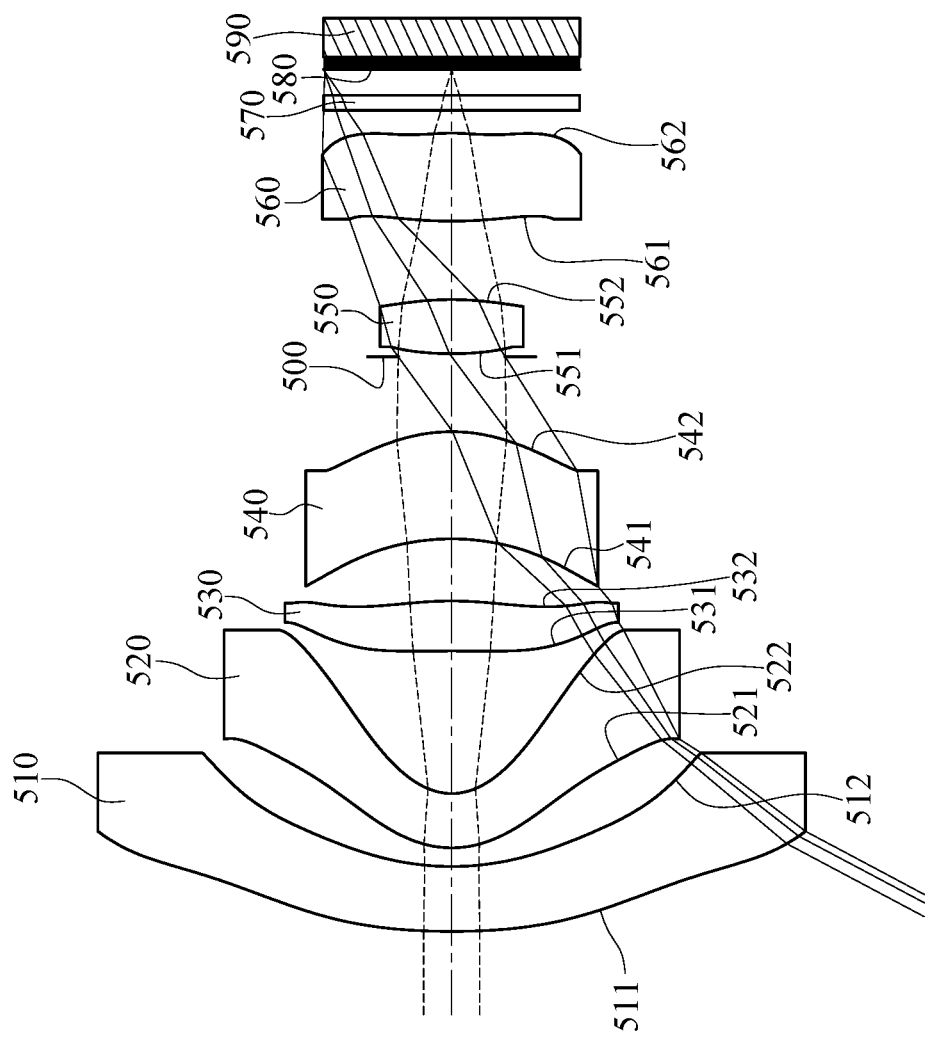
FIG. 9 is a schematic view of an image capturing unit according to the 5th embodiment of the present disclosure.
Figure 10:
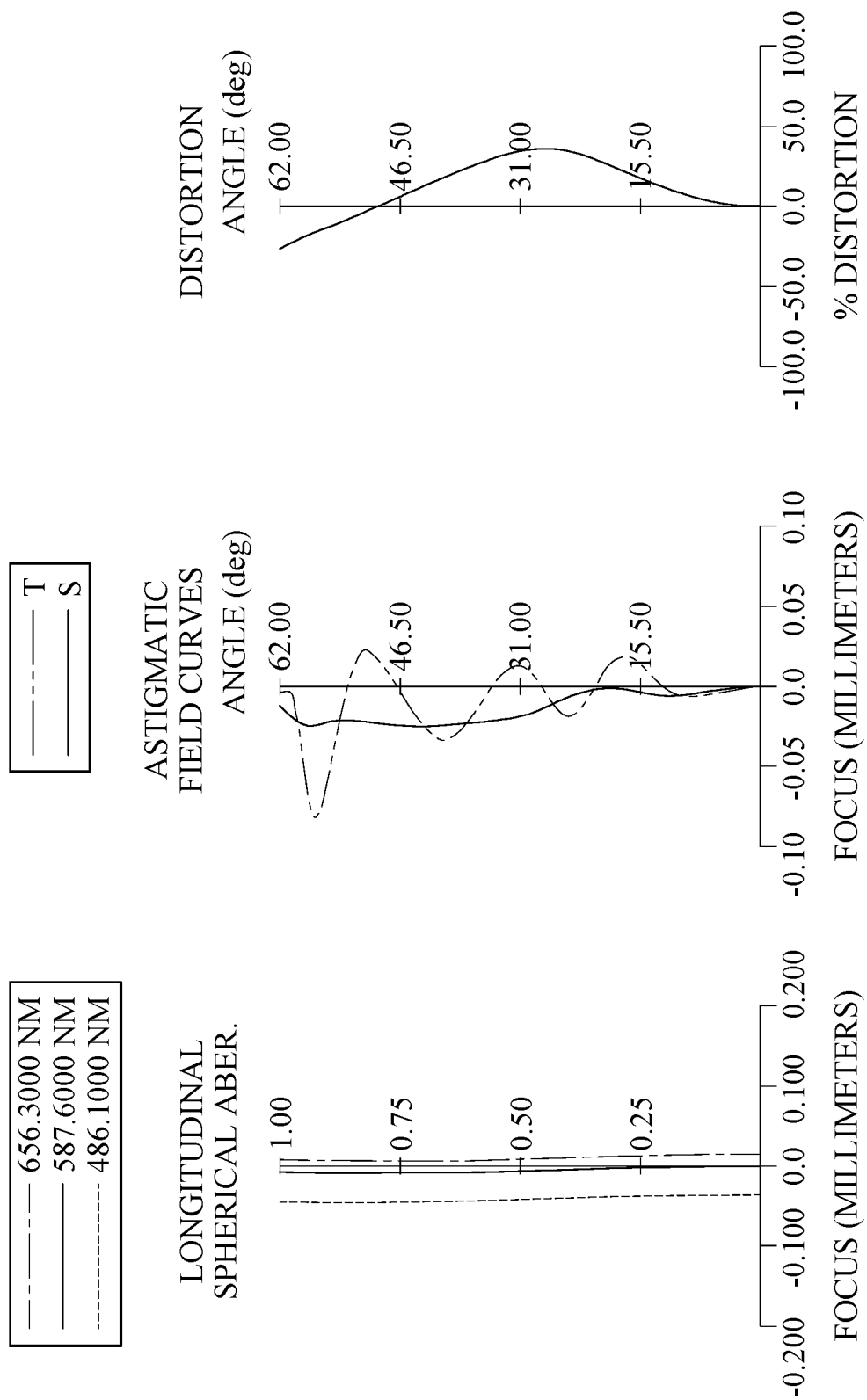
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens system (its reference numeral is omitted) of the present disclosure and an image sensor 590. The optical imaging lens system includes, in order from an object side to an image side, a first lens element 510, a second lens element 520, a third lens element 530, a fourth lens element 540, an aperture stop 500, a fifth lens element 550, a sixth lens element 560, a filter 570 and an image surface 580. The optical imaging lens system includes six lens elements (510, 520, 530, 540, 550, 560) with no additional lens element disposed between the first lens element 510 and the sixth lens element 560.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The object-side surface 531 and the image-side surface 532 of the third lens element 530 each have at least one inflection point.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric. The object-side surface 561 and the image-side surface 562 of the sixth lens element 560 each have at least one non-axial critical point.

The filter 570 is made of glass and located between the sixth lens element 560 and the image surface 580, and will not affect the focal length of the optical imaging lens system. The image sensor 590 is disposed on or near the image surface 580 of the optical imaging lens system. In this embodiment, the optical imaging lens system is favorable for being operated within a wavelength of 587.6 nm.

The detailed optical data of the 5th embodiment are shown in Table 9 and the aspheric surface data are shown in Table 10 below.

Moreover, these parameters can be calculated from Table 9 and Table 10 as the following values and satisfy the following conditions:

| 5th Embodiment | | | |
|---|---|---|---|
| f [mm] | 1.25 | (R4 + R5)/(R4 − R5) | −0.96 |
| Fno | 1.69 | (R6 + R7)/(R6 − R7) | 5.12 |
| HFOV [deg.] | 62.0 | R8/R7 | 0.70 |
| 1/tan (HFOV) | 0.53 | R4/SD22 | 0.33 |
| V3 * Fno | 34.48 | f/T56 | 1.20 |
| CT3/CT4 | 0.47 | f/T34 | 1.52 |
| CT5/CT6 | 0.61 | f3/f6 | 2.36 |
| CT3/T56 | 0.64 | f/EPD | 1.69 |
| T12/CT5 | 0.34 | BL/T56 | 0.81 |

TABLE 9

5th Embodiment
f = 1.25 mm, Fno = 1.69, HFOV = 62.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.437 | (ASP) | 0.858 | Plastic | 1.545 | 56.1 | −11.56 |
| 2 | | 3.657 | (ASP) | 0.247 | | | | |
| 3 | Lens 2 | 1.338 | (ASP) | 0.719 | Plastic | 1.511 | 56.8 | −5.62 |
| 4 | | 0.747 | (ASP) | 1.885 | | | | |
| 5 | Lens 3 | −37.192 | (ASP) | 0.662 | Plastic | 1.660 | 20.4 | 8.00 |
| 6 | | −4.654 | (ASP) | 0.822 | | | | |
| 7 | Lens 4 | −3.132 | (ASP) | 1.418 | Plastic | 1.544 | 56.0 | 8.87 |
| 8 | | −2.202 | (ASP) | 0.991 | | | | |
| 9 | Ape. Stop | Plano | | 0.040 | | | | |
| 10 | Lens 5 | 4.234 | (ASP) | 0.716 | Plastic | 1.544 | 56.0 | 3.96 |
| 11 | | −4.132 | (ASP) | 1.038 | | | | |
| 12 | Lens 6 | 6.549 | (ASP) | 1.164 | Plastic | 1.614 | 26.0 | 3.39 |
| 13 | | −2.847 | (ASP) | 0.300 | | | | |
| 14 | Filter | Plano | | 0.200 | Glass | 1.517 | 64.2 | — |
| 15 | | Plano | | 0.342 | | | | |
| 16 | Image | Plano | | — | | | | |

Note:
Reference wavelength is 587.6 nm (d-line).

TABLE 10

Aspheric Coefficients

| Surface # | 1 | 2 | 3 | 4 | 5 | 6 |
|---|---|---|---|---|---|---|
| k = | −1.7021E+00 | −5.5225E−01 | −2.4199E+00 | −1.1885E+00 | −9.0000E+01 | −7.5672E+00 |
| A4 = | 9.3345E−03 | 3.4379E−03 | 7.0338E−02 | 3.3369E−02 | 1.3169E−02 | 3.1957E−02 |
| A6 = | −1.1834E−03 | −3.2881E−03 | −3.6609E−02 | 1.9735E−02 | 2.8550E−02 | 9.3252E−03 |
| A8 = | 5.1163E−05 | 4.8069E−04 | 7.5107E−02 | −2.9345E−02 | −1.8106E−02 | −1.3476E−02 |
| A10 = | −7.1524E−07 | −2.0053E−05 | −7.6067E−04 | 9.9926E−03 | 5.4357E−03 | 6.3520E−03 |
| A12 = | — | — | 3.6789E−05 | −1.4447E−03 | −8.1746E−04 | −1.3513E−03 |
| A14 = | — | — | −6.7499E−07 | 7.6806E−05 | 4.6647E−05 | 1.0382E−04 |

| Surface # | 7 | 8 | 10 | 11 | 12 | 13 |
|---|---|---|---|---|---|---|
| k = | −1.5111E−01 | −2.5662E+00 | 3.5865E+00 | −1.0041E+01 | 1.0088E+01 | −5.9350E−01 |
| A4 = | 7.3240E−03 | −5.4404E−03 | 2.3752E−02 | −4.8428E−03 | 6.0622E−02 | 4.7408E−01 |
| A6 = | −2.0946E−02 | −5.2091E−03 | −4.6959E−04 | 9.3178E−03 | −1.8706E−01 | −4.9905E−01 |
| A8 = | 1.6614E−02 | 1.1525E−02 | −2.6291E−04 | 4.4593E−03 | 1.8586E−01 | 2.6524E−01 |
| A10 = | −6.3853E−03 | −8.3912E−03 | 9.6415E−03 | 3.1751E−03 | −1.0876E−01 | −7.8227E−02 |
| A12 = | 1.2461E−03 | 2.8242E−03 | −1.6730E−03 | −2.8262E−03 | 3.6303E−02 | 1.1578E−02 |
| A14 = | −9.4404E−05 | −3.3939E−04 | — | — | −5.9797E−03 | −6.7468E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

-continued

| 5th Embodiment | | | |
|---|---|---|---|
| (T12 + T45)/T34 | 1.56 | (|P2| + |P3| + |P4| + |P6|)/|P5| | 2.82 |
| |(T12 + CT2)/SAG12| | 0.64 | Yc61/f | 0.89 |

-continued

| 5th Embodiment | | | |
|---|---|---|---|
| TD/(CT5 + T56 + CT6) | 3.62 | Yc62/f | 0.45 |
| ΣCT/ΣAT | 1.10 | — | — |

6th Embodiment

Figure 11:
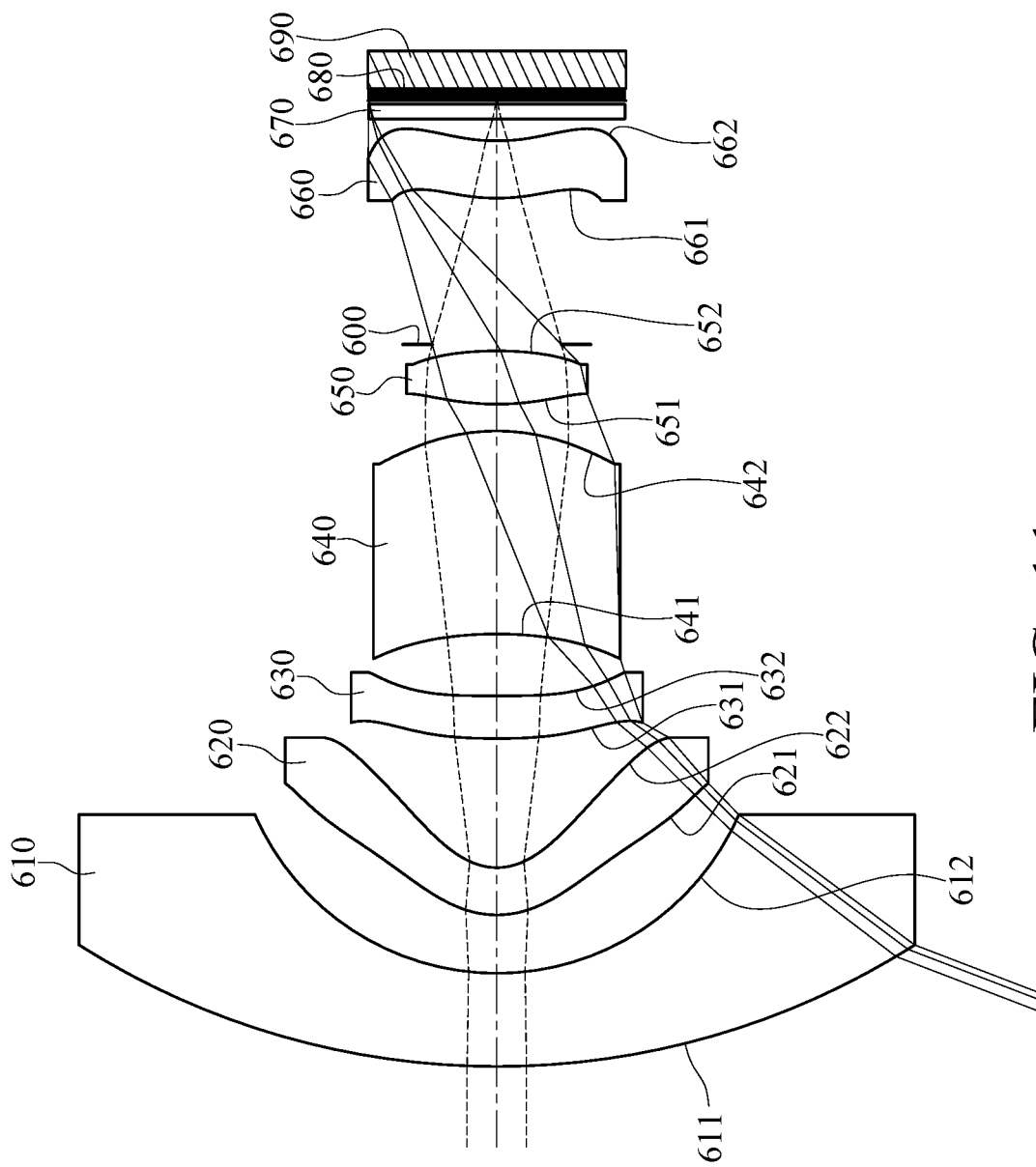
FIG. 11 is a schematic view of an image capturing unit according to the 6th embodiment of the present disclosure.
Figure 12:
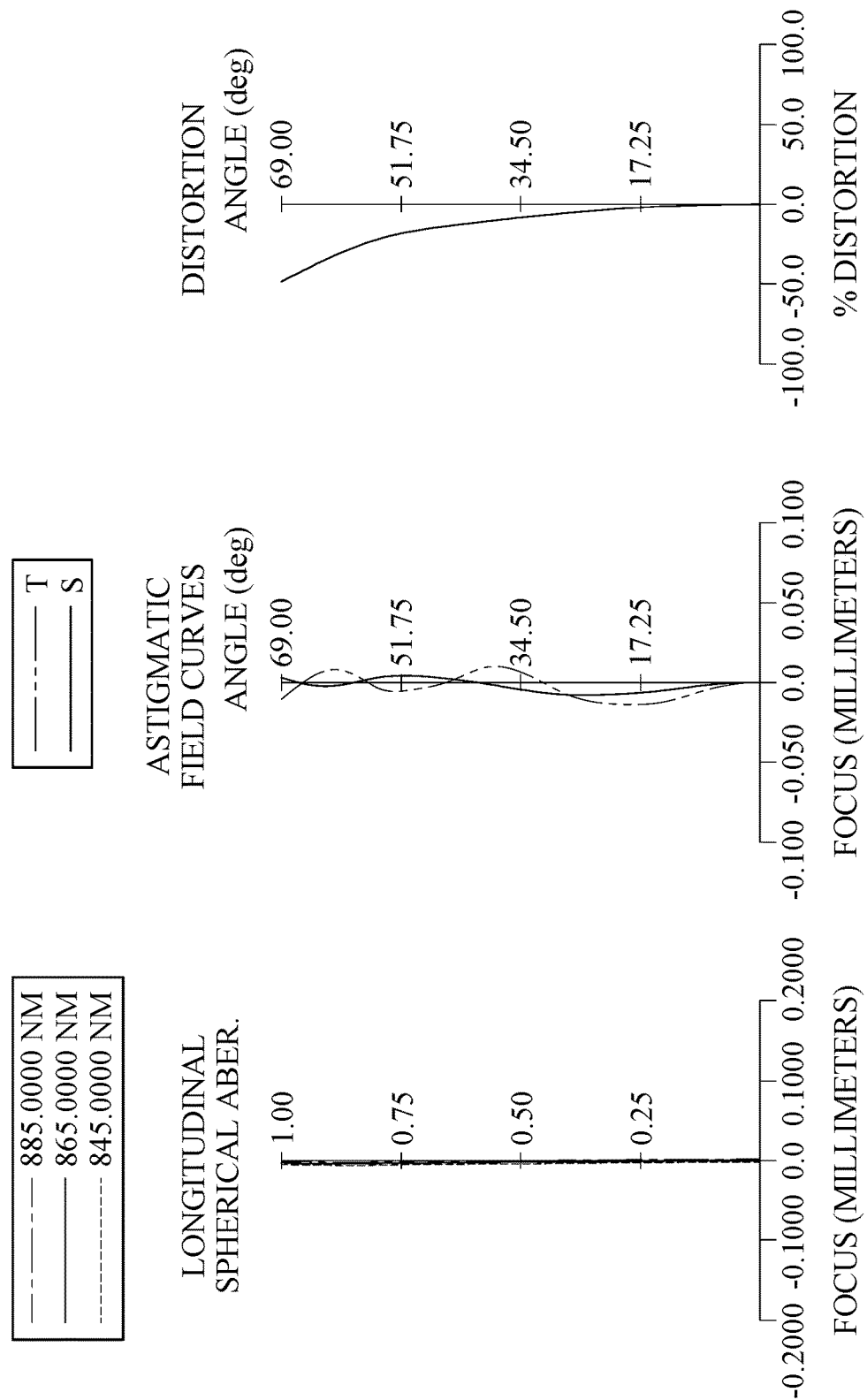
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens system (its reference numeral is omitted) of the present disclosure and an image sensor 690. The optical imaging lens system includes, in order from an object side to an image side, a first lens element 610, a second lens element 620, a third lens element 630, a fourth lens element 640, a fifth lens element 650, an aperture stop 600, a sixth lens element 660, a filter 670 and an image surface 680. The optical imaging lens system includes six lens elements (610, 620, 630, 640, 650, 660) with no additional lens element disposed between the first lens element 610 and the sixth lens element 660.

The first lens element 610 with negative refractive power has an object-side surface 611 being convex in a paraxial region thereof and an image-side surface 612 being concave in a paraxial region thereof. The first lens element 610 is made of glass and has the object-side surface 611 and the image-side surface 612 being both spherical.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 and the image-side surface 632 of the third lens element 630 each have at least one inflection point.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 and the image-side surface 662 of the sixth lens element 660 each have at least one non-axial critical point.

The filter 670 is made of glass and located between the sixth lens element 660 and the image surface 680, and will not affect the focal length of the optical imaging lens system. The image sensor 690 is disposed on or near the image surface 680 of the optical imaging lens system. In this embodiment, the optical imaging lens system is favorable for being operated within a wavelength of 865.0 nm.

The detailed optical data of the 6th embodiment are shown in Table 11 and the aspheric surface data are shown in Table 12 below.

TABLE 11

6th Embodiment
f = 1.37 mm, Fno = 1.70, HFOV = 69.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.640 | | 1.278 | Glass | 1.667 | 53.4 | −8.81 |
| 2 | | 3.605 | | 0.799 | | | | |
| 3 | Lens 2 | 1.294 | (ASP) | 0.648 | Plastic | 1.536 | 55.9 | −7.44 |
| 4 | | 0.806 | (ASP) | 1.768 | | | | |
| 5 | Lens 3 | 8.977 | (ASP) | 0.583 | Plastic | 1.637 | 20.4 | 19.87 |
| 6 | | 30.142 | (ASP) | 0.848 | | | | |
| 7 | Lens 4 | −5.401 | (ASP) | 2.779 | Plastic | 1.536 | 55.9 | 8.01 |
| 8 | | −2.821 | (ASP) | 0.368 | | | | |
| 9 | Lens 5 | 3.602 | (ASP) | 0.729 | Plastic | 1.536 | 55.9 | 3.95 |
| 10 | | −4.772 | (ASP) | 0.088 | | | | |
| 11 | Ape. Stop | Plano | | 2.003 | | | | |
| 12 | Lens 6 | 2.681 | (ASP) | 0.786 | Plastic | 1.504 | 56.5 | 46.81 |
| 13 | | 2.728 | (ASP) | 0.300 | | | | |
| 14 | Filter | Plano | | 0.200 | Glass | 1.517 | 64.2 | — |
| 15 | | Plano | | 0.050 | | | | |
| 16 | Image | Plano | | — | | | | |

Note:
Reference wavelength is 865.0 nm.

TABLE 12

Aspheric Coefficients

| Surface # | | | | | |
|---|---|---|---|---|---|
| | 3 | 4 | 5 | 6 | 7 |
| k = | −2.5099E+00 | −1.2412E+00 | −1.7095E+00 | 4.7118E+01 | −1.0200E+01 |
| A4 = | 8.0407E−02 | 5.8835E−02 | 2.1971E−02 | 3.6080E−02 | −1.0250E−02 |
| A6 = | −4.9328E−02 | −6.8971E−02 | 1.1562E−02 | 1.2659E−02 | −9.1055E−03 |
| A8 = | 1.3045E−02 | 2.3845E−02 | −1.3797E−02 | −1.4711E−02 | 7.2321E−03 |
| A10 = | −1.8259E−03 | −3.9325E−03 | 4.5425E−03 | 5.1878E−03 | −3.4863E−03 |
| A12 = | 1.3575E−04 | 2.8439E−04 | −7.1664E−04 | −5.8060E−04 | 9.5368E−04 |
| A14 = | −4.2551E−06 | −6.0017E−06 | 4.3805E−05 | −2.2587E−05 | −1.0160E−04 |

| Surface # | | | | | |
|---|---|---|---|---|---|
| | 8 | 9 | 10 | 12 | 13 |
| k = | −1.7260E+00 | −1.1279E+00 | −1.3488E+00 | −1.7151E+01 | −1.9324E+00 |
| A4 = | −5.7039E−03 | −1.3936E−02 | −2.0536E−02 | 9.7745E−02 | 3.5152E−02 |
| A6 = | 1.2857E−03 | −2.4186E−03 | −4.1131E−04 | −2.6894E−01 | −1.5252E−01 |
| A8 = | 1.5004E−04 | −1.9967E−03 | −3.3179E−03 | 3.0719E−01 | 1.2893E−01 |
| A10 = | −1.2892E−04 | −2.3179E−04 | −9.0592E−04 | −2.2543E−01 | −5.8073E−02 |
| A12 = | −1.4791E−06 | −1.2113E−03 | 1.9486E−04 | 8.8593E−02 | 1.2762E−02 |
| A14 = | 8.6955E−06 | — | — | −1.4400E−02 | −1.1494E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.37 | (R4 + R5)/(R4 − R5) | −1.20 |
| Fno | 1.70 | (R6 + R7)/(R6 − R7) | 0.70 |
| HFOV [deg.] | 69.0 | R8/R7 | 0.52 |
| 1/tan (HFOV) | 0.38 | R4/SD22 | 0.34 |
| V3 * Fno | 34.68 | f/T56 | 0.65 |
| CT3/CT4 | 0.21 | f/T34 | 1.61 |
| CT5/CT6 | 0.93 | f3/f6 | 0.42 |
| CT3/T56 | 0.28 | f/EPD | 1.70 |
| T12/CT5 | 1.10 | BL/T56 | 0.26 |
| (T12 + T45)/T34 | 1.38 | (|P2| + |P3| + |P4| + |P6|)/|P5| | 1.31 |
| |(T12 + CT2)/SAG12| | 0.67 | Yc61/f | 0.77 |
| TD/(CT5 + T56 + CT6) | 3.52 | Yc62/f | 0.91 |
| ΣCT/ΣAT | 1.16 | — | — |

7th Embodiment

Figure 13:
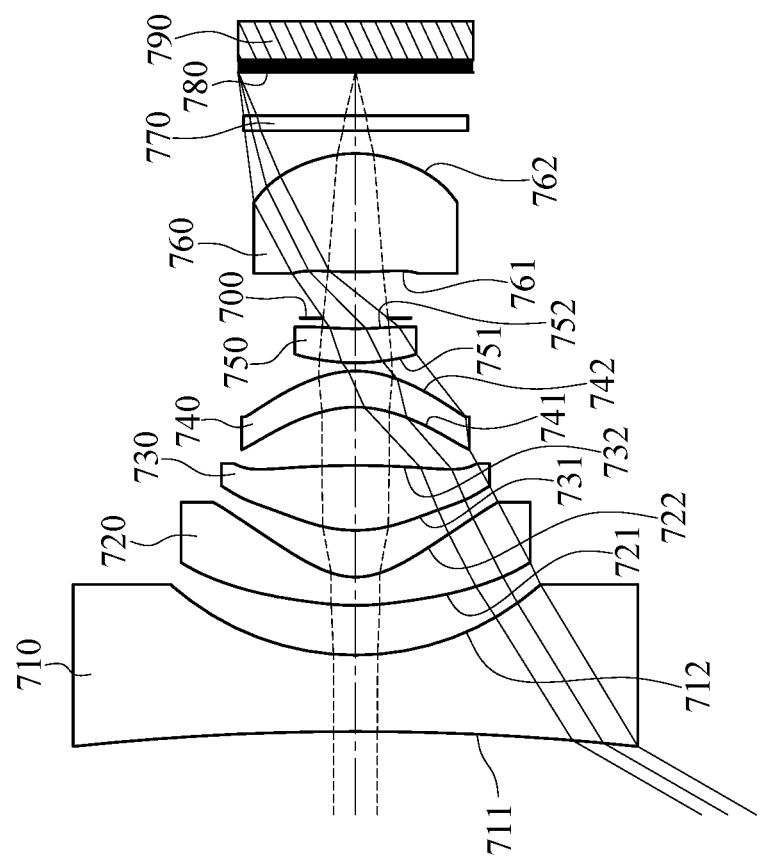
FIG. 13 is a schematic view of an image capturing unit according to the 7th embodiment of the present disclosure.
Figure 14:
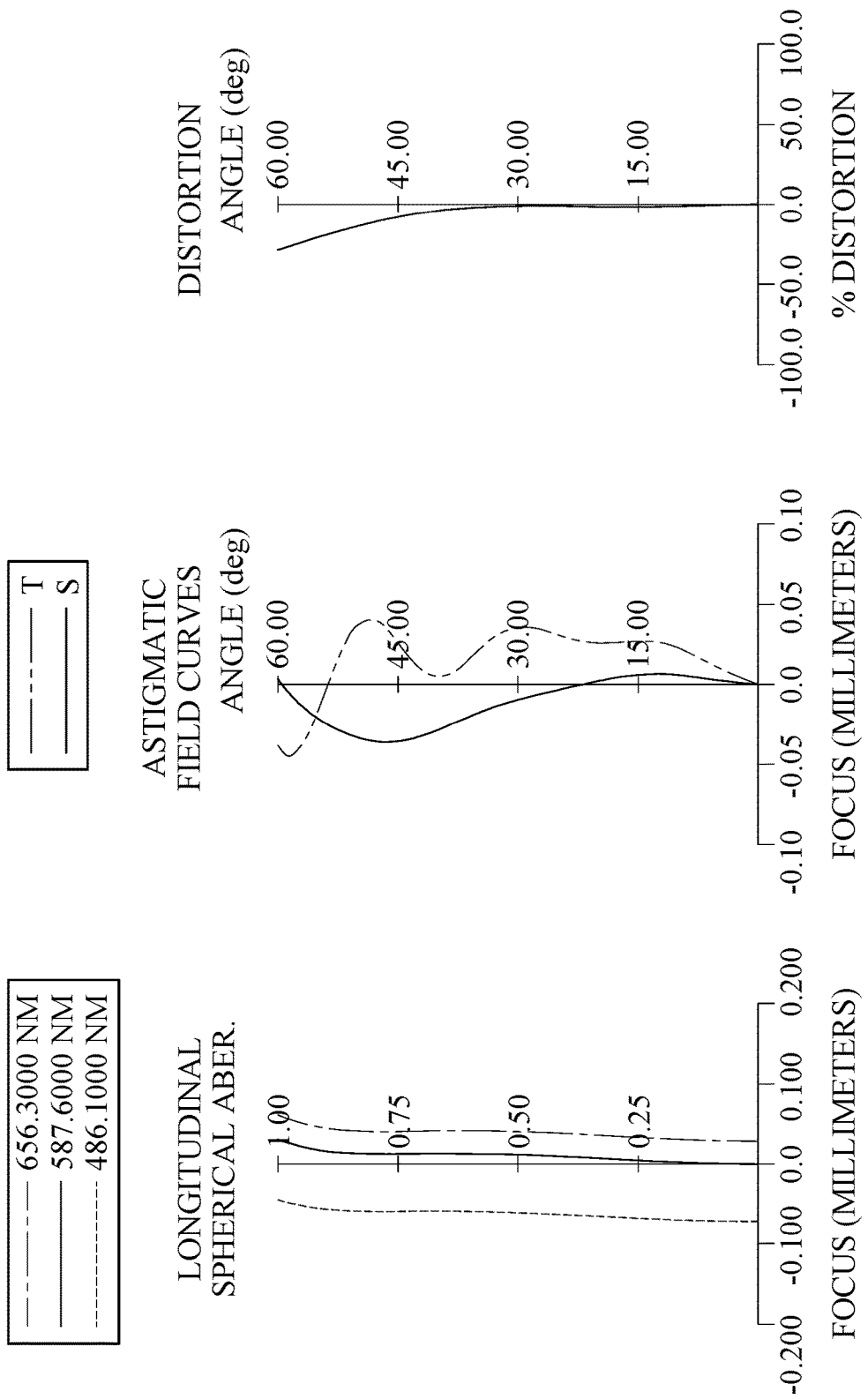
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens system (its reference numeral is omitted) of the present disclosure and an image sensor 790. The optical imaging lens system includes, in order from an object side to an image side, a first lens element 710, a second lens element 720, a third lens element 730, a fourth lens element 740, a fifth lens element 750, an aperture stop 700, a sixth lens element 760, a filter 770 and an image surface 780. The optical imaging lens system includes six lens elements (710, 720, 730, 740, 750, 760) with no additional lens element disposed between the first lens element 710 and the sixth lens element 760.

The first lens element 710 with negative refractive power has an object-side surface 711 being concave in a paraxial region thereof and an image-side surface 712 being concave in a paraxial region thereof. The first lens element 710 is made of glass and has the object-side surface 711 and the image-side surface 712 being both spherical.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. The object-side surface 731 and the image-side surface 732 of the third lens element 730 each have at least one inflection point.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one non-axial critical point.

The filter 770 is made of glass and located between the sixth lens element 760 and the image surface 780, and will not affect the focal length of the optical imaging lens system. The image sensor 790 is disposed on or near the image surface 780 of the optical imaging lens system. In this embodiment, the optical imaging lens system is favorable for being operated within a wavelength of 587.6 nm.

The detailed optical data of the 7th embodiment are shown in Table 13 and the aspheric surface data are shown in Table 14 below.

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.28 | (R4 + R5)/(R4 − R5) | −3.06 |
| Fno | 2.21 | (R6 + R7)/(R6 − R7) | 1.31 |

TABLE 13

7th Embodiment
f = 1.28 mm, Fno = 2.21, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −35.296 | | 1.009 | Glass | 1.517 | 64.2 | −6.36 |
| 2 | | 3.661 | | 0.659 | | | | |
| 3 | Lens 2 | 3.034 | (ASP) | 0.376 | Plastic | 1.544 | 55.9 | −2.58 |
| 4 | | 0.919 | (ASP) | 0.618 | | | | |
| 5 | Lens 3 | 1.810 | (ASP) | 0.858 | Plastic | 1.660 | 20.4 | 2.42 |
| 6 | | −11.112 | (ASP) | 0.772 | | | | |
| 7 | Lens 4 | −1.505 | (ASP) | 0.478 | Plastic | 1.544 | 55.9 | 10.80 |
| 8 | | −1.332 | (ASP) | 0.108 | | | | |
| 9 | Lens 5 | 2.473 | (ASP) | 0.452 | Plastic | 1.639 | 23.5 | 9.16 |
| 10 | | 3.979 | (ASP) | 0.141 | | | | |
| 11 | Ape. Stop | Plano | | 0.610 | | | | |
| 12 | Lens 6 | 5.763 | (ASP) | 1.567 | Plastic | 1.639 | 23.5 | 2.16 |
| 13 | | −1.619 | (ASP) | 0.300 | | | | |
| 14 | Filter | Plano | | 0.200 | Glass | 1.517 | 64.2 | — |
| 15 | | Plano | | 0.569 | | | | |
| 16 | Image | Plano | | — | | | | |

Note:
Reference wavelength is 587.6 nm (d-line).

TABLE 14

Aspheric Coefficients

| | Surface # | | | | |
|---|---|---|---|---|---|
| | 3 | 4 | 5 | 6 | 7 |
| k = | −3.3104E+01 | −1.5403E+00 | −3.4597E+00 | −7.5463E+00 | −4.5139E−01 |
| A4 = | −2.2879E−03 | −9.4075E−02 | 3.2668E−02 | 1.2156E−02 | 1.1153E−01 |
| A6 = | 6.6302E−03 | 4.9064E−02 | −4.1670E−02 | −9.3250E−03 | −7.9379E−02 |
| A8 = | −6.8821E−04 | −2.2525E−02 | 3.1074E−03 | 8.5529E−05 | 6.1826E−02 |
| A10 = | −3.3723E−04 | 7.7969E−03 | 7.1009E−03 | 3.5570E−03 | −3.1777E−02 |
| A12 = | 8.9467E−05 | −1.5247E−03 | −2.0043E−03 | −6.5129E−04 | 9.7868E−03 |
| A14 = | −6.0389E−06 | 1.1793E−04 | 1.3160E−04 | — | −1.1953E−03 |

| | Surface # | | | | |
|---|---|---|---|---|---|
| | 8 | 9 | 10 | 12 | 13 |
| k = | −2.9996E+00 | −5.5098E+00 | −6.8051E+01 | −8.2722E+01 | −2.0588E+00 |
| A4 = | −1.3037E−02 | −4.6510E−02 | −1.1840E−01 | −2.0504E−01 | −5.8776E−02 |
| A6 = | −1.0828E−02 | 1.4634E−02 | 2.8791E−02 | 1.4526E+00 | 2.3778E−01 |
| A8 = | 9.1921E−03 | −1.5646E−03 | −4.0969E−02 | −7.8172E+00 | −4.6575E−01 |
| A10 = | −2.1094E−03 | 3.5707E−02 | 2.9694E−01 | 2.1635E+01 | 4.5901E−01 |
| A12 = | −1.4733E−04 | 7.9219E−02 | 1.0157E+00 | −3.3760E+01 | −2.6970E−01 |
| A14 = | 1.7112E−04 | 1.3920E−01 | 7.2507E+00 | 2.7788E+01 | 8.6744E−02 |
| A16 = | — | — | — | −9.3789E+00 | −1.1636E−02 |

-continued

| 7th Embodiment | | | |
|---|---|---|---|
| HFOV [deg.] | 60.0 | R8/R7 | 0.88 |
| 1/tan (HFOV) | 0.58 | R4/SD22 | 0.49 |
| V3 * Fno | 45.08 | f/T56 | 1.70 |
| CT3/CT4 | 1.79 | f/T34 | 1.65 |
| CT5/CT6 | 0.29 | f3/f6 | 1.12 |
| CT3/T56 | 1.14 | f/EPD | 2.21 |
| T12/CT5 | 1.46 | BL/T56 | 1.42 |
| (T12 + T45)/T34 | 0.99 | (|P2| + |P3| + |P4| + |P6|)/|P5| | 12.41 |
| |(T12 + CT2)/SAG12| | 1.11 | Yc61/f | 0.43 |
| TD/(CT5 + T56 + CT6) | 2.76 | Yc62/f | — |
| ΣCT/ΣAT | 1.63 | — | — |

8th Embodiment

Figure 15:
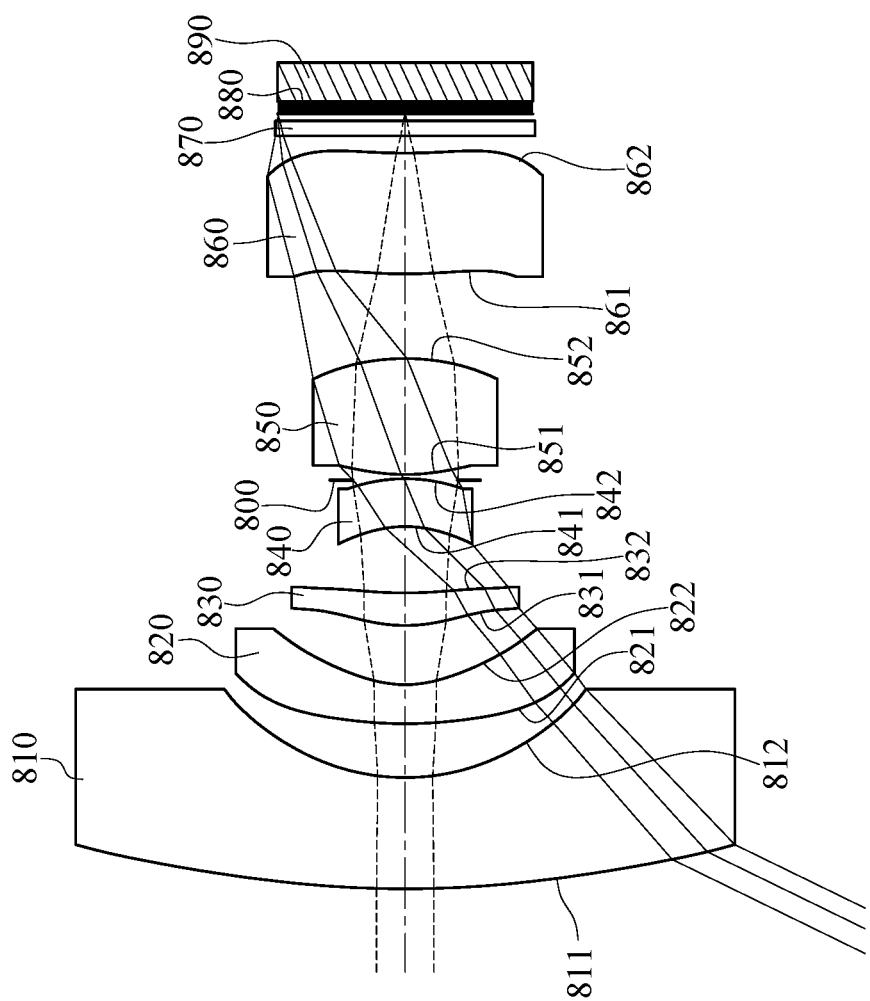
FIG. 15 is a schematic view of an image capturing unit according to the 8th embodiment of the present disclosure.
Figure 16:
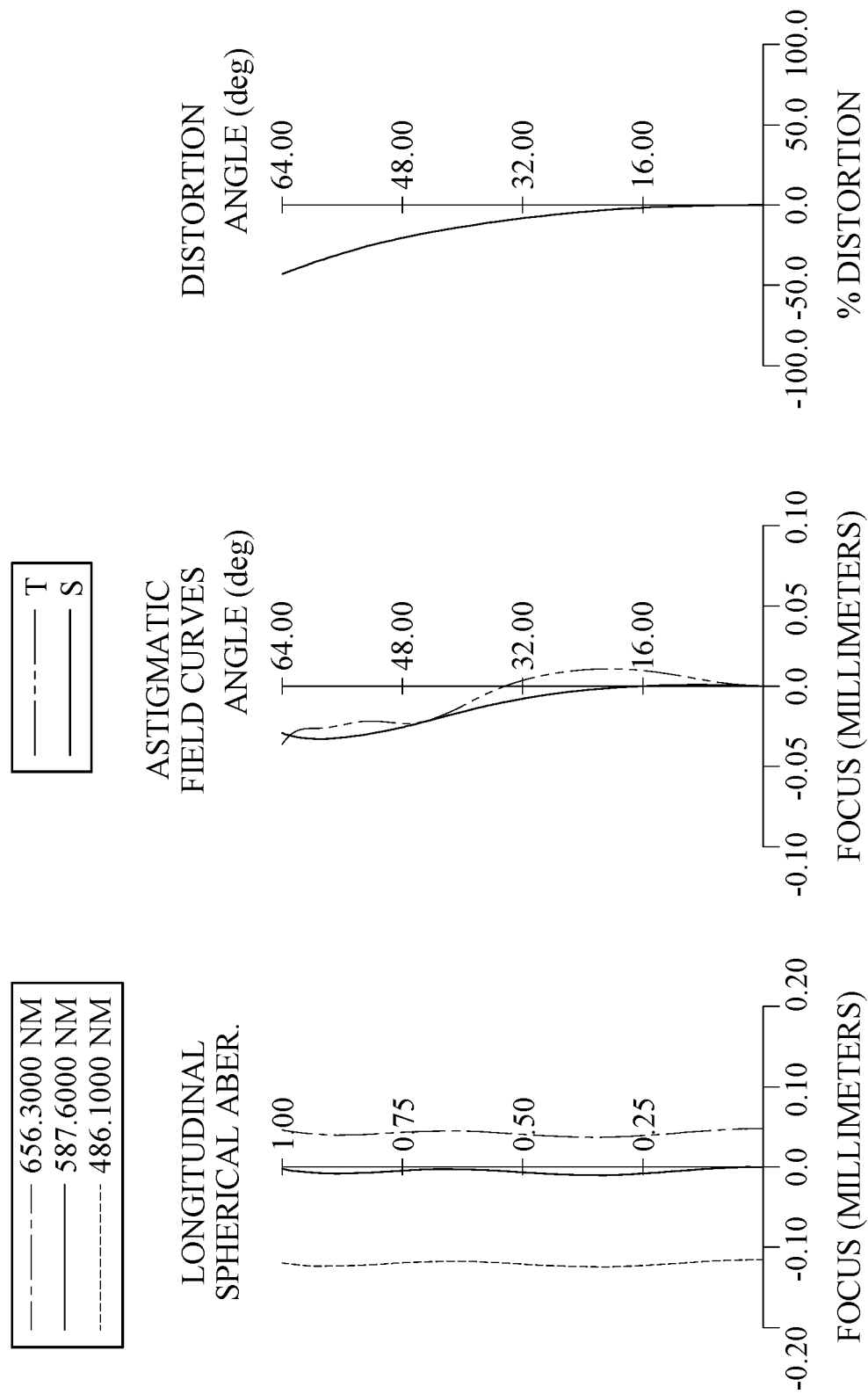
FIG. 16 shows spherical aberration curves, astigmatic field curves and a distortion curve of the image capturing unit according to the 8th embodiment.

FIG. 15 is a schematic view of an image capturing unit according to the 7th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens system (its reference numeral is omitted) of the present disclosure and an image sensor 890. The optical imaging lens system includes, in order from an object side to an image side, a first lens element 810, a second lens element 820, a third lens element 830, a fourth lens element 840, an aperture stop 800, a fifth lens element 850, a sixth lens element 860, a filter 870 and an image surface 880. The optical imaging lens system includes six lens elements (810, 820, 830, 840, 850, 860) with no additional lens element disposed between the first lens element 810 and the sixth lens element 860.

The first lens element 810 with negative refractive power has an object-side surface 811 being convex in a paraxial region thereof and an image-side surface 812 being concave in a paraxial region thereof. The first lens element 810 is made of glass and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 and the image-side surface 832 of the third lens element 830 each have at least one inflection point.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 and the image-side surface 862 of the sixth lens element 860 each have at least one non-axial critical point.

The filter 870 is made of glass and located between the sixth lens element 860 and the image surface 880, and will not affect the focal length of the optical imaging lens system. The image sensor 890 is disposed on or near the image surface 880 of the optical imaging lens system. In this embodiment, the optical imaging lens system is favorable for being operated within a wavelength of 587.6 nm.

The detailed optical data of the 8th embodiment are shown in Table 15 and the aspheric surface data are shown in Table 16 below.

TABLE 15

8th Embodiment
f = 1.50 mm, Fno = 1.98, HFOV = 64.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.806 | (ASP) | 1.471 | Glass | 1.607 | 56.7 | −6.46 |
| 2 | | 2.932 | (ASP) | 0.712 | | | | |
| 3 | Lens 2 | 5.020 | (ASP) | 0.517 | Plastic | 1.544 | 56.0 | −4.07 |
| 4 | | 1.480 | (ASP) | 0.783 | | | | |
| 5 | Lens 3 | 2.011 | (ASP) | 0.431 | Plastic | 1.671 | 19.5 | 4.51 |
| 6 | | 5.478 | (ASP) | 0.877 | | | | |
| 7 | Lens 4 | −1.527 | (ASP) | 0.633 | Plastic | 1.544 | 56.0 | −14.78 |
| 8 | | −2.160 | (ASP) | −0.019 | | | | |
| 9 | Ape. Stop | Plano | | 0.075 | | | | |
| 10 | Lens 5 | 2.720 | (ASP) | 1.534 | Plastic | 1.671 | 19.5 | 2.40 |
| 11 | | −3.047 | (ASP) | 1.119 | | | | |
| 12 | Lens 6 | 5.820 | (ASP) | 1.598 | Plastic | 1.671 | 19.5 | 27.35 |
| 13 | | 7.585 | (ASP) | 0.226 | | | | |

TABLE 15-continued

8th Embodiment
f = 1.50 mm, Fno = 1.98, HFOV = 64.0 deg.

| Surface # | | Curvature Radius | Thickness | Material | Index | Abbe # | Focal Length |
|---|---|---|---|---|---|---|---|
| 14 | Filter | Plano | 0.200 | Glass | 1.517 | 64.2 | — |
| 15 | | Plano | 0.094 | | | | |
| 16 | Image | Plano | — | | | | |

Note:
Reference wavelength is 587.6 nm (d-line).

TABLE 16

Aspheric Coefficients

| Surface # | 1 | 2 | 3 | 4 | 5 | 6 |
|---|---|---|---|---|---|---|
| k = | 2.8142E+00 | 2.9772E−01 | −2.7744E+01 | −1.9408E+00 | −6.2092E+00 | −8.2518E+01 |
| A4 = | −7.0921E−04 | 9.9314E−04 | −4.9385E−03 | −7.2223E−02 | 3.8561E−03 | 1.9473E−02 |
| A6 = | 8.8944E−06 | −2.1242E−03 | 8.7794E−03 | 5.5965E−02 | −2.3498E−02 | −3.8274E−02 |
| A8 = | −3.0221E−07 | 2.8068E−04 | −1.6035E−03 | −2.7370E−02 | −1.7570E−02 | 1.0491E−02 |
| A10 = | 2.0391E−08 | −3.0217E−05 | 6.5224E−05 | 9.6452E−03 | 1.8220E−02 | 2.5282E−03 |
| A12 = | — | — | 3.1672E−05 | −1.8771E−03 | −4.7517E−03 | −5.6042E−04 |
| A14 = | — | — | −3.6622E−06 | 1.3944E−04 | 4.0357E−04 | — |

| Surface # | 7 | 8 | 10 | 11 | 12 | 13 |
|---|---|---|---|---|---|---|
| k = | −2.5383E−01 | −2.2452E+00 | −2.7940E+00 | −8.0774E−01 | −4.0019E+01 | 5.9489E+00 |
| A4 = | 1.0855E−01 | −3.3454E−02 | −3.3328E−02 | −1.5394E−02 | −2.5578E−02 | −1.2848E−02 |
| A6 = | −9.1646E−02 | 2.2953E−01 | 1.0818E−02 | 3.5547E−03 | −5.2362E−03 | −6.3730E−02 |
| A8 = | 1.2056E−01 | −9.3949E−01 | 8.0372E−03 | −1.1040E−03 | 5.1572E−03 | 6.0188E−02 |
| A10 = | −1.6117E−01 | 1.7917E+00 | −3.1242E−02 | −5.0075E−04 | −5.0900E−03 | −3.1373E−02 |
| A12 = | 1.4644E−01 | −1.6053E+00 | 3.3092E−02 | 6.4075E−04 | 1.5989E−03 | 8.8730E−03 |
| A14 = | −5.6428E−02 | 5.3992E−01 | −1.3084E−02 | −1.4679E−04 | −1.0638E−04 | −1.2984E−03 |
| A16 = | — | — | — | — | −1.2182E−05 | 7.8309E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.50 | (R4 + R5)/(R4 − R5) | −6.57 |
| Fno | 1.98 | (R6 + R7)/(R6 − R7) | 0.56 |
| HFOV [deg.] | 64.0 | R8/R7 | 1.41 |
| 1/tan (HFOV) | 0.49 | R4/SD22 | 0.85 |
| V3 * Fno | 38.57 | f/T56 | 1.34 |
| CT3/CT4 | 0.68 | f/T34 | 1.71 |
| CT5/CT6 | 0.96 | f3/f6 | 0.16 |
| CT3/T56 | 0.38 | f/EPD | 1.98 |
| T12/CT5 | 0.46 | BL/T56 | 0.46 |
| (T12 + T45)/T34 | 0.88 | (|P2| + |P3| + |P4| + |P6|)/|P5| | 1.37 |
| |(T12 + CT2)/SAG12| | 1.05 | Yc61/f | 0.65 |
| TD/(CT5 + T56 + CT6) | 2.29 | Yc62/f | 0.60 |
| ΣCT/ΣAT | 1.74 | — | |

9th Embodiment

Figure 17:
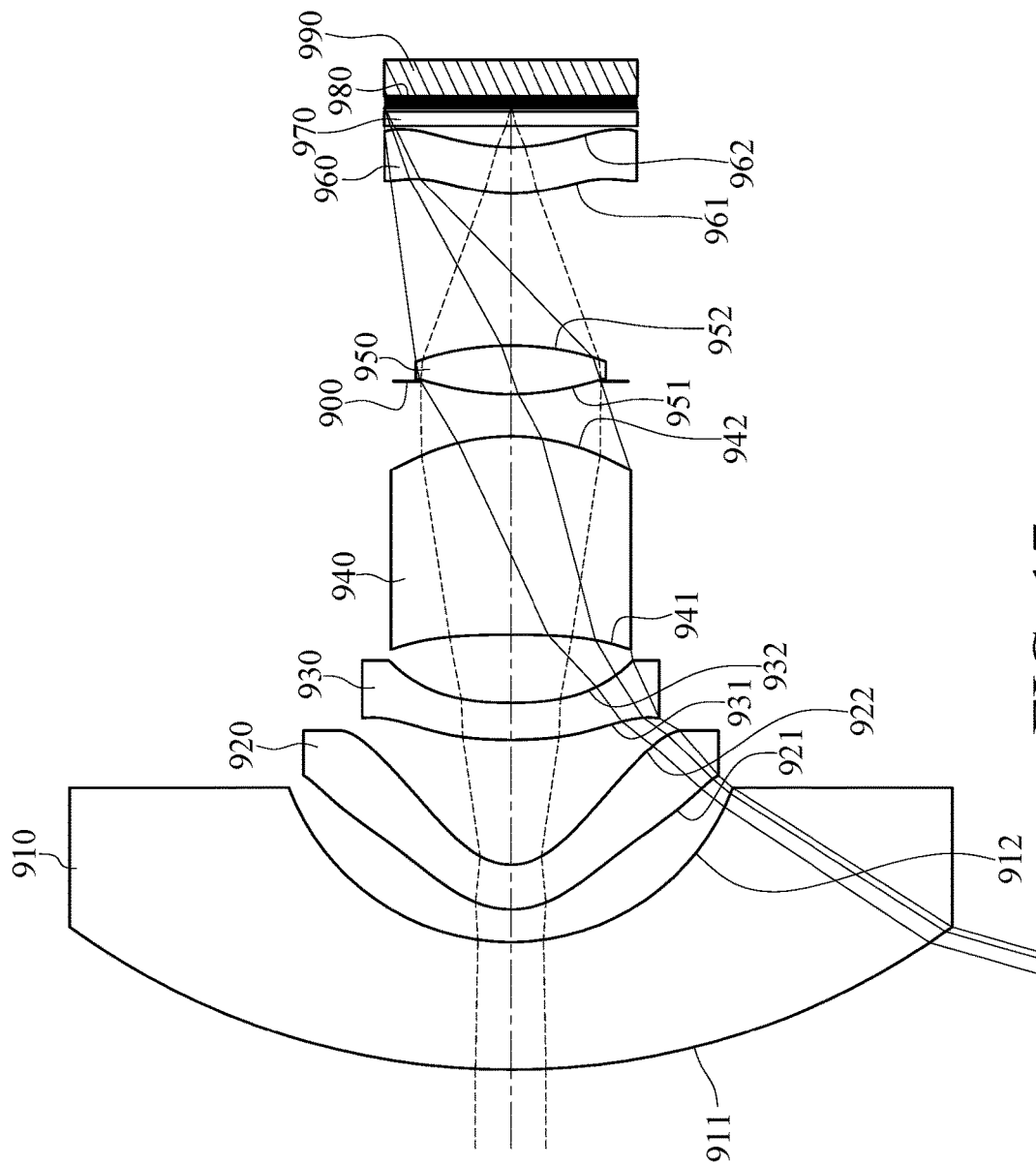
FIG. 17 is a schematic view of an image capturing unit according to the 9th embodiment of the present disclosure.
Figure 18:
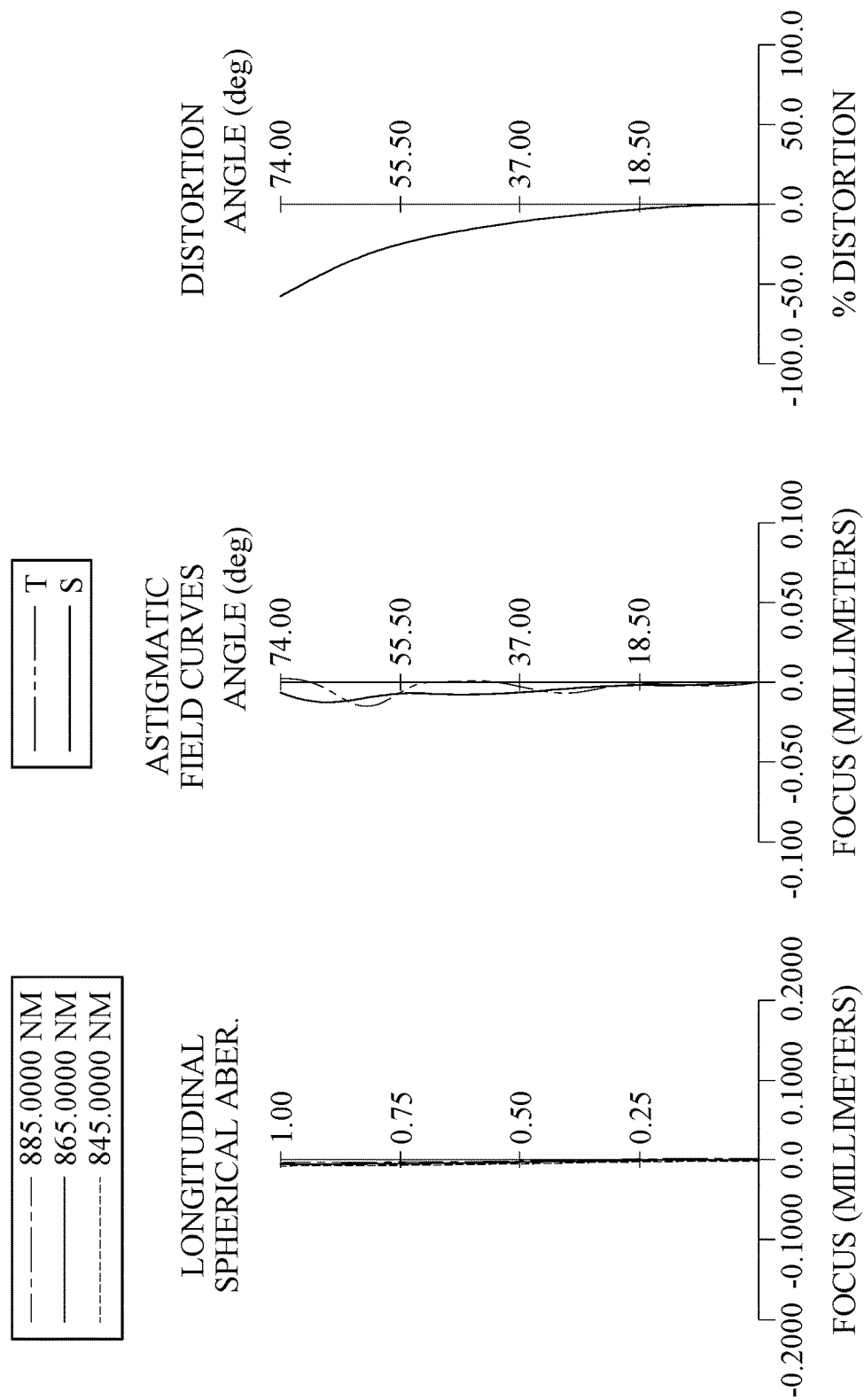
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens system (its reference numeral is omitted) of the present disclosure and an image sensor 990. The optical imaging lens system includes, in order from an object side to an image side, a first lens element 910, a second lens element 920, a third lens element 930, a fourth lens element 940, an aperture stop 900, a fifth lens element 950, a sixth lens element 960, a filter 970 and an image surface 980. The optical imaging lens system includes six lens elements (910, 920, 930, 940, 950, 960) with no additional lens element disposed between the first lens element 910 and the sixth lens element 960.

The first lens element 910 with negative refractive power has an object-side surface 911 being convex in a paraxial region thereof and an image-side surface 912 being concave in a paraxial region thereof. The first lens element 910 is made of glass and has the object-side surface 911 and the image-side surface 912 being both spherical.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has at least one inflection point.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with positive refractive power has an object-side surface 951 being convex in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 and the image-side surface 962 of the sixth lens element 960 each have at least one non-axial critical point.

The filter 970 is made of glass and located between the sixth lens element 960 and the image surface 980, and will not affect the focal length of the optical imaging lens system. The image sensor 990 is disposed on or near the image surface 980 of the optical imaging lens system. In this embodiment, the optical imaging lens system is favorable for being operated within a wavelength of 865.0 nm.

The detailed optical data of the 9th embodiment are shown in Table 17 and the aspheric surface data are shown in Table 18 below.

TABLE 17

9th Embodiment
f = 1.30 mm, Fno = 1.30, HFOV = 74.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.548 | | 1.800 | Glass | 1.667 | 53.4 | −8.07 |
| 2 | | 3.321 | | 0.457 | | | | |
| 3 | Lens 2 | 1.215 | (ASP) | 0.627 | Plastic | 1.536 | 55.9 | −8.12 |
| 4 | | 0.779 | (ASP) | 1.762 | | | | |
| 5 | Lens 3 | 6.352 | (ASP) | 0.517 | Plastic | 1.637 | 20.4 | −43.21 |
| 6 | | 4.997 | (ASP) | 0.956 | | | | |
| 7 | Lens 4 | −15.520 | (ASP) | 2.795 | Plastic | 1.536 | 55.9 | 6.19 |
| 8 | | −2.906 | (ASP) | 0.769 | | | | |
| 9 | Ape. Stop | Plano | | −0.178 | | | | |
| 10 | Lens 5 | 3.745 | (ASP) | 0.682 | Plastic | 1.536 | 55.9 | 3.79 |
| 11 | | −4.160 | (ASP) | 2.134 | | | | |
| 12 | Lens 6 | 2.431 | (ASP) | 0.653 | Plastic | 1.536 | 55.9 | 22.51 |
| 13 | | 2.759 | (ASP) | 0.300 | | | | |
| 14 | Filter | Plano | | 0.200 | Glass | 1.517 | 64.2 | — |
| 15 | | Plano | | 0.050 | | | | |
| 16 | Image | Plano | | — | | | | |

Note:
Reference wavelength is 865.0 nm.

TABLE 18

Aspheric Coefficients

| Surface # | | | | |
|---|---|---|---|---|
| 3 | 4 | 5 | 6 | 7 |

| | 3 | 4 | 5 | 6 | 7 |
|---|---|---|---|---|---|
| k = | −2.1775E+00 | −1.2291E+00 | −4.1663E+00 | −3.5475E+00 | 1.7628E+01 |
| A4 = | 7.8891E−02 | 5.9817E−02 | 2.1464E−02 | 3.9244E−02 | −8.4459E−03 |
| A6 = | −4.9281E−02 | −6.8840E−02 | 1.1449E−02 | 1.3087E−02 | −9.0433E−03 |
| A8 = | 1.3050E−02 | 2.3852E−02 | −1.3761E−02 | −1.4901E−02 | 7.2451E−03 |
| A10 = | −1.8266E−03 | −3.9340E−03 | 4.5541E−03 | 5.2994E−03 | −3.5977E−03 |
| A12 = | 1.3561E−04 | 2.8349E−04 | −7.1304E−04 | −5.4270E−04 | 9.2411E−04 |
| A14 = | −4.2488E−06 | −5.9767E−06 | 4.4119E−05 | −2.6147E−05 | −8.4120E−05 |

| | Surface # | | | | |
|---|---|---|---|---|---|
| | 8 | 10 | 11 | 12 | 13 |
| k = | −1.9390E+00 | 2.1808E−01 | −4.8393E+00 | −6.6493E−01 | 8.3871E−01 |
| A4 = | −6.4589E−03 | −9.1259E−03 | −1.3703E−02 | −3.7788E−02 | −3.9553E−02 |
| A6 = | 7.0497E−04 | 1.7381E−03 | 2.9804E−03 | 6.7843E−03 | 3.1080E−02 |
| A8 = | 2.4469E−04 | −1.3394E−03 | −1.1323E−03 | −1.8501E−02 | −3.8286E−02 |
| A10 = | −8.5195E−05 | 5.9888E−04 | 3.9407E−04 | 5.5781E−03 | 1.6192E−02 |
| A12 = | 8.7990E−06 | −1.1625E−04 | −7.1641E−05 | 3.1969E−04 | −3.1024E−03 |
| A14 = | 2.2651E−06 | — | — | −1.8392E−04 | 2.1292E−04 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.30 | (R4 + R5)/(R4 − R5) | −1.28 |
| Fno | 1.30 | (R6 + R7)/(R6 − R7) | −0.51 |
| HFOV [deg.] | 74.0 | R8/R7 | 0.19 |
| 1/tan (HFOV) | 0.29 | R4/SD22 | 0.33 |
| V3 * Fno | 26.52 | f/T56 | 0.61 |
| CT3/CT4 | 0.18 | f/T34 | 1.36 |
| CT5/CT6 | 1.04 | f3/f6 | −1.92 |
| CT3/T56 | 0.24 | f/EPD | 1.30 |
| T12/CT5 | 0.67 | BL/T56 | 0.26 |
| (T12 + T45)/T34 | 1.10 | (|P2| + |P3| + |P4| + |P6|)/|P5| | 1.34 |
| |(T12 + CT2)/SAG12| | 0.50 | Yc61/f | 1.04 |
| TD/(CT5 + T56 + CT6) | 3.74 | Yc62/f | 1.20 |
| ΣCT/ΣAT | 1.20 | — | — |

10th Embodiment

Figure 19:
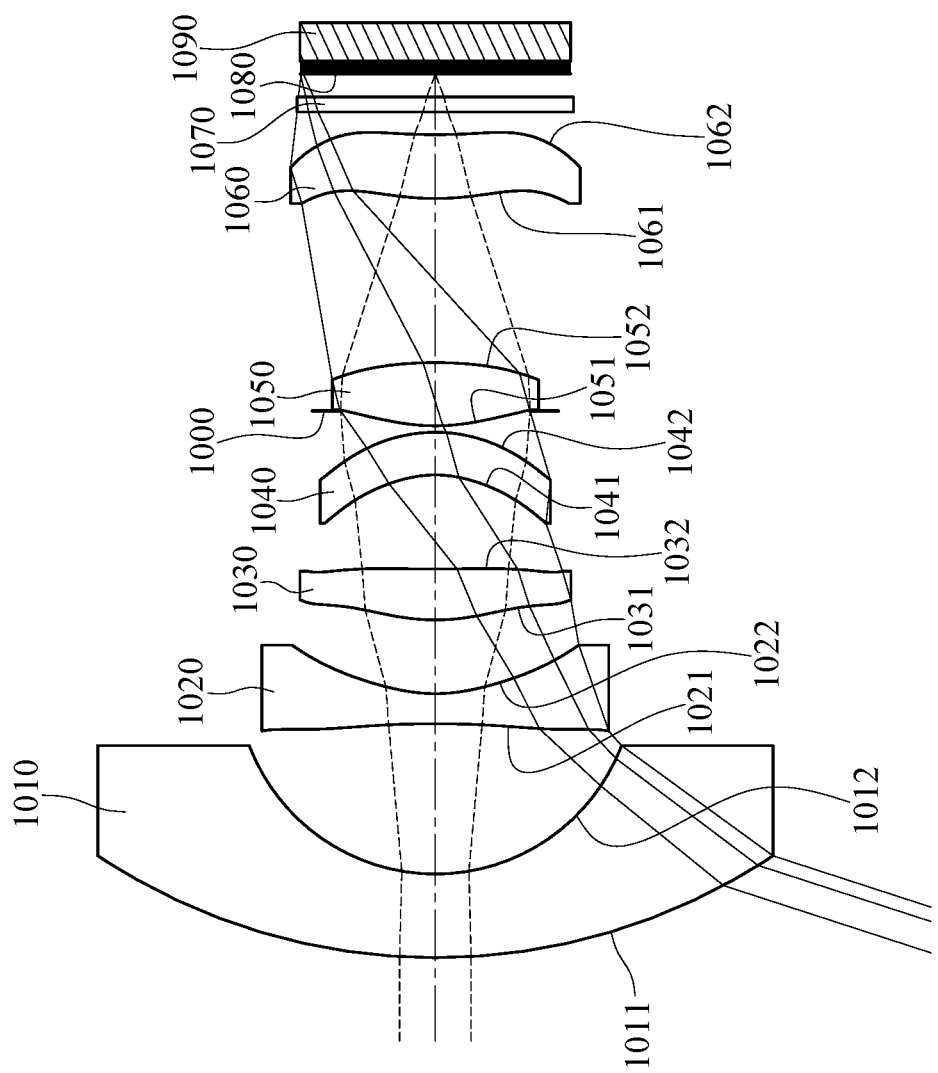
FIG. 19 is a schematic view of an image capturing unit according to the 10th embodiment of the present disclosure.
Figure 20:
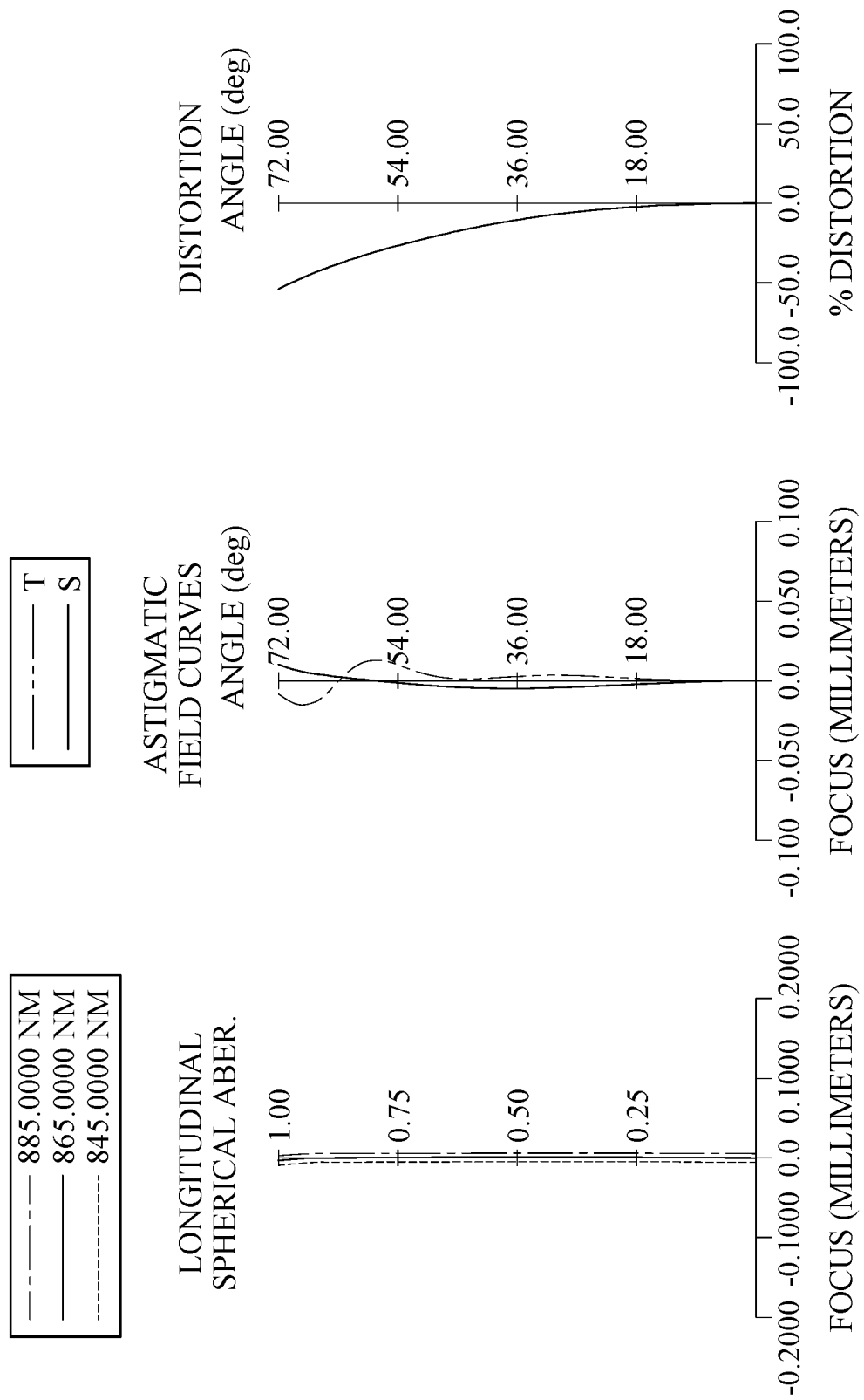
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens system (its reference numeral is omitted) of the present disclosure and an image sensor 1090. The optical imaging lens system includes, in order from an object side to an image side, a first lens element 1010, a second lens element 1020, a third lens element 1030, a fourth lens element 1040, an aperture stop 1000, a fifth lens element 1050, a sixth lens element 1060, a filter 1070 and an image surface 1080. The optical imaging lens system includes six lens elements (1010, 1020, 1030, 1040, 1050, 1060) with no additional lens element disposed between the first lens element 1010 and the sixth lens element 1060.

The first lens element 1010 with negative refractive power has an object-side surface 1011 being convex in a paraxial region thereof and an image-side surface 1012 being concave in a paraxial region thereof. The first lens element 1010 is made of glass and has the object-side surface 1011 and the image-side surface 1012 being both spherical.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 and the image-side surface 1032 of the third lens element 1030 each have at least one inflection point.

The fourth lens element 1040 with negative refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with positive refractive power has an object-side surface 1051 being convex in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with positive refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The object-side surface 1061 and the image-side surface 1062 of the sixth lens element 1060 each have at least one non-axial critical point.

The filter 1070 is made of glass and located between the sixth lens element 1060 and the image surface 1080, and will not affect the focal length of the optical imaging lens system. The image sensor 1090 is disposed on or near the image surface 1080 of the optical imaging lens system. In this embodiment, the optical imaging lens system is favorable for being operated within a wavelength of 865.0 nm.

The detailed optical data of the 10th embodiment are shown in Table 19 and the aspheric surface data are shown in Table 20 below.

TABLE 19

10th Embodiment
f = 1.33 mm, Fno = 1.41, HFOV = 72.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.052 | | 1.109 | Glass | 1.790 | 46.5 | −5.43 |
| 2 | | 2.629 | | 1.987 | | | | |
| 3 | Lens 2 | −17.668 | (ASP) | 0.399 | Plastic | 1.536 | 55.9 | −3.46 |
| 4 | | 2.088 | (ASP) | 0.976 | | | | |
| 5 | Lens 3 | 2.650 | (ASP) | 0.674 | Plastic | 1.637 | 20.4 | 4.52 |
| 6 | | 30.544 | (ASP) | 1.244 | | | | |
| 7 | Lens 4 | −1.496 | (ASP) | 0.565 | Plastic | 1.536 | 55.9 | −20.86 |
| 8 | | −1.955 | (ASP) | 0.280 | | | | |
| 9 | Ape. Stop | Plano | | −0.195 | | | | |
| 10 | Lens 5 | 2.570 | (ASP) | 0.836 | Plastic | 1.619 | 23.5 | 2.95 |
| 11 | | −5.504 | (ASP) | 2.171 | | | | |
| 12 | Lens 6 | 3.551 | (ASP) | 0.844 | Plastic | 1.619 | 23.3 | 10.19 |

TABLE 19-continued

10th Embodiment
f = 1.33 mm, Fno = 1.41, HFOV = 72.0 deg.

| Surface # | | Curvature Radius | Thickness | Material | Index | Abbe # | Focal Length |
|---|---|---|---|---|---|---|---|
| 13 | | 7.388 (ASP) | 0.300 | | | | |
| 14 | Filter | Plano | 0.200 | Glass | 1.517 | 64.2 | — |
| 15 | | Plano | 0.305 | | | | |
| 16 | Image | Plano | — | | | | |

Note:
Reference wavelength is 865.0 nm.

TABLE 20

Aspheric Coefficients

| Surface # | | | | | |
|---|---|---|---|---|---|
| | 3 | 4 | 5 | 6 | 7 |
| k = | 3.9508E+01 | −1.8763E+00 | −3.8653E+00 | −9.0000E+01 | −5.2982E−01 |
| A4 = | −2.1390E−02 | −5.6588E−02 | −1.9313E−02 | −9.3781E−03 | 1.1223E−01 |
| A6 = | 1.7982E−02 | 2.5847E−02 | −1.1851E−02 | −1.0618E−02 | −1.0056E−01 |
| A8 = | −5.2783E−03 | −1.8987E−03 | 2.5041E−03 | 3.2843E−03 | 7.1960E−02 |
| A10 = | 8.1729E−04 | −1.7046E−03 | −5.2434E−04 | 5.7297E−05 | −3.6616E−02 |
| A12 = | −6.2403E−05 | 5.2262E−04 | 5.4108E−04 | 3.9484E−05 | 1.0820E−02 |
| A14 = | 1.2608E−06 | −4.6194E−05 | −8.5853E−05 | — | −1.2262E−03 |

| Surface # | | | | | |
|---|---|---|---|---|---|
| | 8 | 10 | 11 | 12 | 13 |
| k = | −1.7964E+00 | −2.8447E+00 | 3.8365E+00 | −5.5703E+00 | −1.8173E+01 |
| A4 = | −1.0231E−02 | −4.4810E−02 | −1.5883E−02 | −1.7382E−02 | −9.1409E−03 |
| A6 = | −1.8066E−02 | 2.0607E−02 | 3.8481E−03 | −2.1666E−02 | −3.3443E−02 |
| A8 = | 1.3013E−02 | −9.5612E−03 | −4.3133E−03 | 8.2461E−03 | −1.5656E−03 |
| A10 = | −5.2913E−03 | 2.9178E−03 | 3.1378E−03 | −5.2766E−03 | 9.6766E−03 |
| A12 = | 1.0604E−03 | −6.3772E−04 | −1.2611E−03 | 2.8984E−03 | −3.7088E−03 |
| A14 = | −1.3950E−05 | 1.6440E−04 | 2.7091E−04 | −7.2179E−04 | 5.6197E−04 |
| A16 = | — | — | — | 6.5382E−05 | −3.0328E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.33 | (R4 + R5)/(R4 − R5) | −8.43 |
| Fno | 1.41 | (R6 + R7)/(R6 − R7) | 0.91 |
| HFOV [deg.] | 72.0 | R8/R7 | 1.31 |
| 1/tan (HFOV) | 0.32 | R4/SD22 | 1.10 |
| V3 * Fno | 28.76 | f/T56 | 0.61 |
| CT3/CT4 | 1.19 | f/T34 | 1.07 |
| CT5/CT6 | 0.99 | f3/f6 | 0.44 |
| CT3/T56 | 0.31 | f/EPD | 1.41 |
| T12/CT5 | 2.38 | BL/T56 | 0.37 |
| (T12 + T45)/T34 | 1.67 | (\|P2\| + \|P3\| + \|P4\| + \|P6\|)/\|P5\| | 1.94 |
| \|(T12 + CT2)/SAG12\| | 1.40 | Yc61/f | 0.86 |
| TD/(CT5 + T56 + CT6) | 2.83 | Yc62/f | 0.65 |
| ΣCT/ΣAT | 0.69 | — | — |

11th Embodiment

Figure 21:
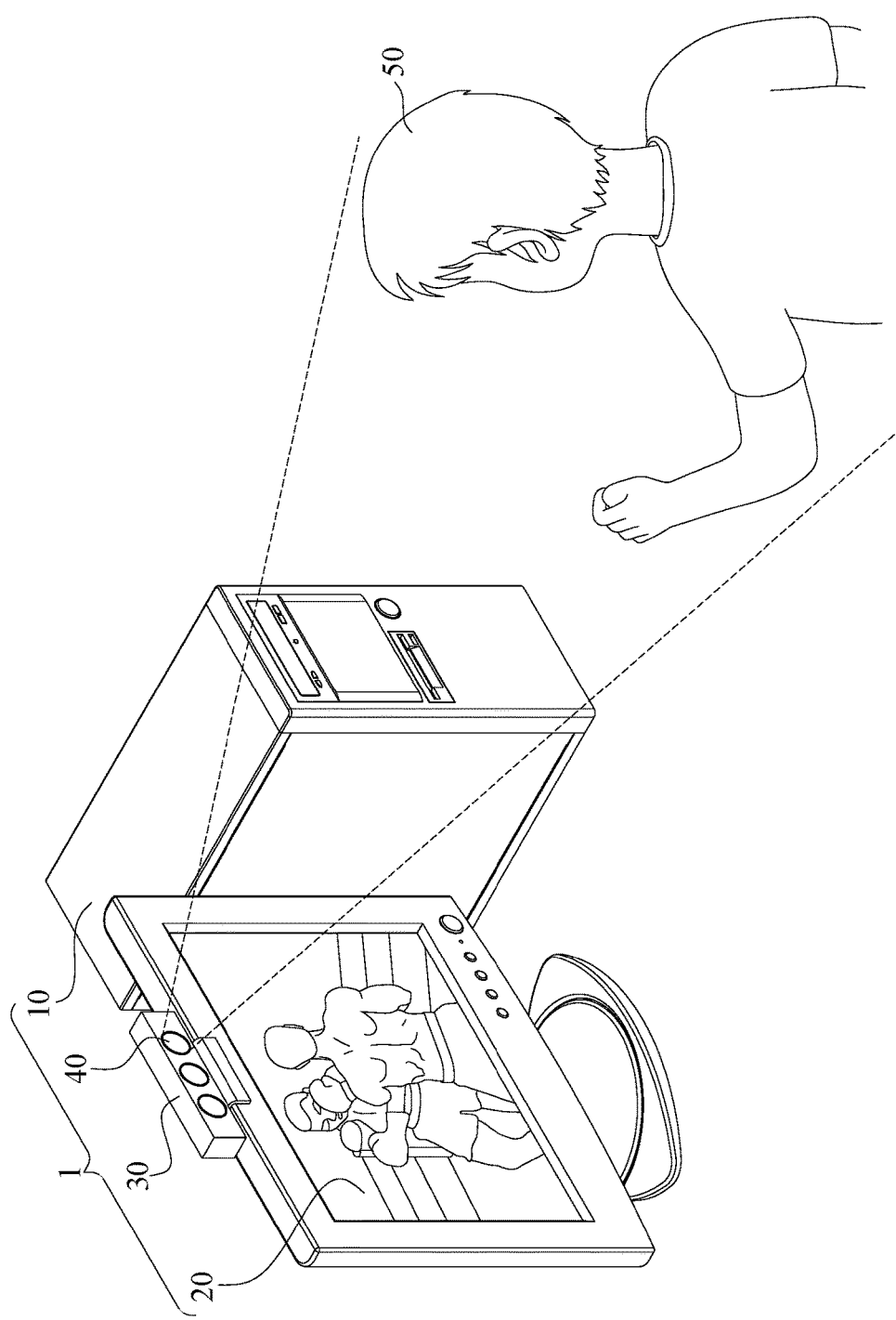
FIG. 21 is perspective view of an image recognition device according to the 11th embodiment of the present disclosure.

FIG. 21 is perspective view of an image recognition device according to the 11th embodiment of the present disclosure. In this embodiment, an image recognition device 1 includes a computer 10, a display unit 20 and an image capturing unit 30. The display unit 20 is electrically connected to the computer 10, and the image capturing unit 30 is electrically connected to the computer 10 and the display unit 20. The image capturing unit 30 includes a camera 40, and the camera 40 includes the optical imaging lens system disclosed in the 1st embodiment. The image capturing unit 30 further includes a barrel, a holder member or a combination thereof. The image recognition device 1 captures an image of a user 50 by the image capturing unit 30, and the captured image is processed by an image processing software installed in the computer 10 to realize motion detection and face recognition.

Figure 22:
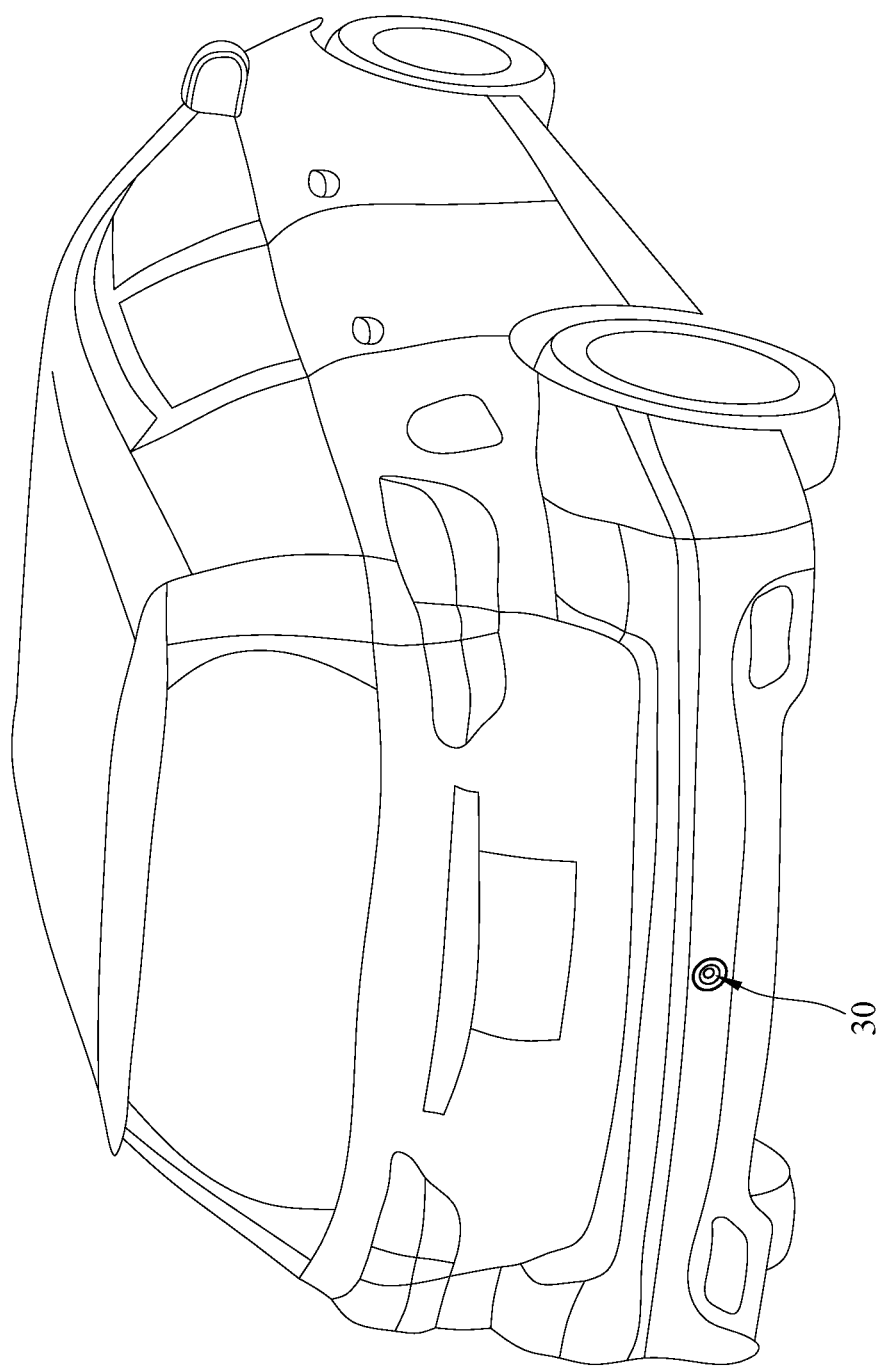
FIG. 22 shows an electronic device according to one embodiment.
Figure 23:
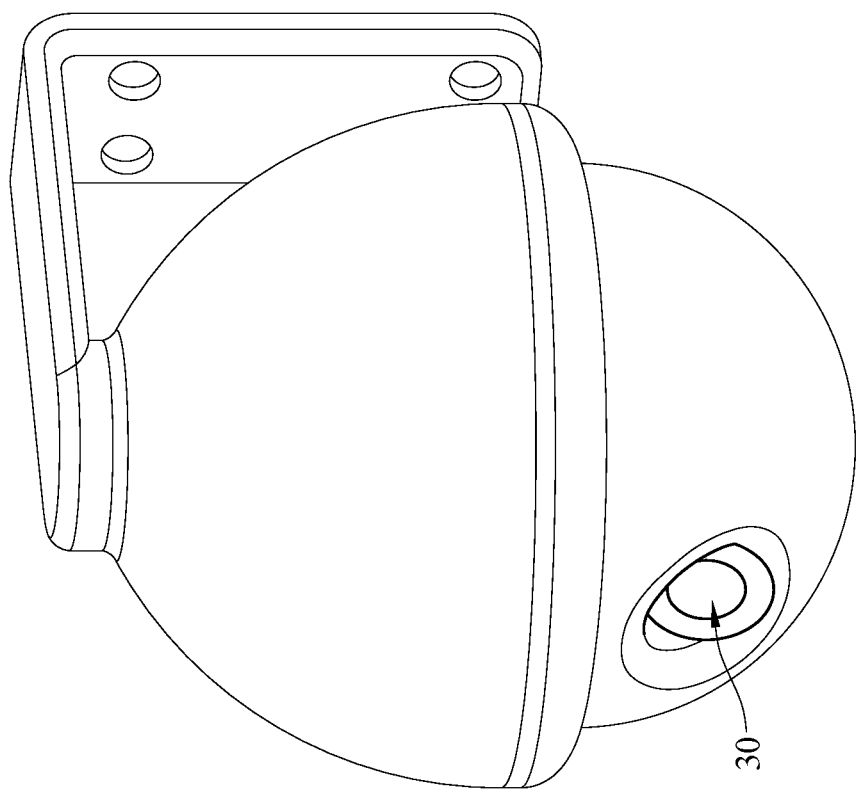
FIG. 23 shows an electronic device according to another embodiment.
Figure 24:
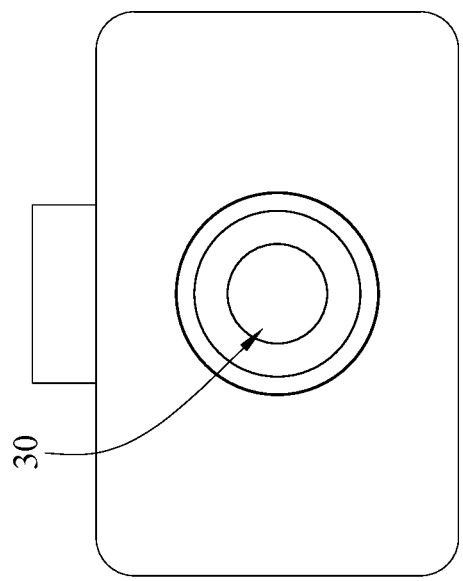
FIG. 24 shows an electronic device according to still another embodiment.

In this embodiment, the image capturing unit 30 is applied to the image recognition device 1, but the present disclosure is not limited thereto. The image capturing unit 30 may be applied to other electronic devices, such as a vehicle backup camera (FIG. 22), a network surveillance device (FIG. 23) or a dashboard camera (FIG. 24). In some cases, the electronic device may further include a control unit, a display unit, a storage unit, a random access memory unit (RAM) or a combination thereof.

The image capturing unit can be optionally applied to optical systems with a movable focus. Furthermore, the optical imaging lens system of the image capturing unit is featured with good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, motion sensing input devices, multiple lens devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising six lens elements, the six lens elements being, in order from an object side to an image side:
    a first lens element having negative refractive power;
    a second lens element;
    a third lens element;
    a fourth lens element having an image-side surface being convex in a paraxial region thereof;
    a fifth lens element having positive refractive power; and
    a sixth lens element having an object-side surface being convex in a paraxial region thereof;
    wherein the optical imaging lens system has a total of six lens elements, a focal length of the optical imaging lens system is f, an axial distance between the third lens element and the fourth lens element is T34, an axial distance between the fifth lens element and the sixth lens element is T56, an axial distance between an object-side surface of the first lens element and an image-side surface of the sixth lens element is TD, a central thickness of the fifth lens element is CTS5, a central thickness of the sixth lens element is CT6, and the following conditions are satisfied:

$0 < f/T56 < 4.50$;

$0 < f/T34 < 4.0$; and $1.20 < TD/(CT5+T56+CT6) < 4.0$.

2. The optical imaging lens system of claim 1, wherein the second lens element has negative refractive power.

3. The optical imaging lens system of claim 1, wherein the fourth lens element has an object-side surface being concave in a paraxial region thereof, and either an object-side surface of the third lens element, an image-side surface of the third lens element or both the object-side surface and the image-side surface of the third lens element have at least one inflection point.

4. The optical imaging lens system of claim 1, wherein the focal length of the optical imaging lens system is f, the axial distance between the third lens element and the fourth lens element is T34, the axial distance between the fifth lens element and the sixth lens element is T56, and the following conditions are satisfied:

$0 < f/T56 < 3.0$; and $0 < f/T34 < 3.0$.

5. The optical imaging lens system of claim 1, wherein a curvature radius of an image-side surface of the second lens element is R4, a curvature radius of an object-side surface of the third lens element is R5, and the following condition is satisfied:

$(R4+R5)/(R4-R5) < -0.75$.

6. The optical imaging lens system of claim 1, wherein a curvature radius of an image-side surface of the second lens element is R4, a maximum effective radius of the image-side surface of the second lens element is SD22, and the following condition is satisfied:

$0.05 < R4/SD22 < 1.50$.

7. The optical imaging lens system of claim 1, wherein a sum of central thicknesses of the six lens elements of the optical imaging lens system is $\Sigma CT$, a sum of axial distances between each of all adjacent lens elements of the six lens elements of the optical imaging lens system is $\Sigma AT$, a central thickness of the third lens element is CT3, a central thickness of the fourth lens element is CT4, and the following conditions are satisfied:

$0.45 < \Sigma CT/\Sigma AT < 3.50$; and $0.05 < CT3/CT4 < 2.0$.

8. The optical imaging lens system of claim 1, wherein a central thickness of the third lens element is CT3, the axial distance between the fifth lens element and the sixth lens element is T56, half of a maximum field of view of the optical imaging lens system is HFOV, and the following conditions are satisfied:

$0 < CT3/T56 < 2.90$; and $1/|\tan(\text{HFOV})| < 0.70$.

9. The optical imaging lens system of claim 1, wherein a refractive power of the second lens element is P2, a refractive power of the third lens element is P3, a refractive power of the fourth lens element is P4, a refractive power of the fifth lens element is P5, a refractive power of the sixth lens element is P6, and the following condition is satisfied:

$0 < (|P2|+|P3|+|P4|+|P6|)/|P5| < 3.0$.

10. The optical imaging lens system of claim 1, wherein an Abbe number of the third lens element is V3, an f-number of the optical imaging lens system is Fno, and the following condition is satisfied:

$15 < V3*Fno < 58$.

11. The optical imaging lens system of claim 1, wherein the focal length of the optical imaging lens system is f, an entrance pupil diameter of the optical imaging lens system is EPD, and the following condition is satisfied:

$0.70 < f/\text{EPD} < 2.40$.

12. The optical imaging lens system of claim 1, wherein the optical imaging lens system is for being operated within a wavelength range of 750 nanometers (nm) to 950 nm.

13. The optical imaging lens system of claim 1, wherein either the object-side surface of the sixth lens element, the image-side surface of the sixth lens element or both the object-side surface and the image-side surface of the sixth lens element have at least one non-axial critical point, the focal length of the optical imaging lens system is f, a vertical distance between the at least one non-axial critical point closest to an optical axis on any surface of the sixth lens element and the optical axis is Yc6x, and the following condition is satisfied:

$0<Yc6x/f<1.80.$

14. An image capturing system, comprising:
the optical imaging lens system of claim 1, and
an image sensor, wherein the image sensor is disposed on an image surface of the optical imaging lens system.

15. An electronic device, comprising:
the image capturing system of claim 14, and
a control unit.

16. An optical imaging lens system, comprising six lens elements, the six lens elements being, in order from an object side to an image side:
a first lens element having negative refractive power;
a second lens element having negative refractive power;
a third lens element;
a fourth lens element having an object-side surface being concave in a paraxial region thereof and an image-side surface being convex in a paraxial region thereof;
a fifth lens element having positive refractive power; and
a sixth lens element;
wherein the optical imaging lens system has a total of six lens elements, a focal length of the optical imaging lens system is f, an axial distance between the first lens element and the second lens element is T12, an axial distance between the third lens element and the fourth lens element is T34, an axial distance between the fourth lens element and the fifth lens element is T45, an axial distance between the fifth lens element and the sixth lens element is T56, a central thickness of the fifth lens element is CT5, a central thickness of the sixth lens element is CT6, and the following conditions are satisfied:

$0<f/T56<4.80;$ $0.15<CT5/CT6<1.90;$ and $0<(T12+T45)/T34<2.0.$

17. The optical imaging lens system of claim 16, wherein the sixth lens element has an object-side surface being convex in a paraxial region thereof.

18. The optical imaging lens system of claim 16, further comprising an aperture stop disposed between the fourth lens element and an image surface.

19. The optical imaging lens system of claim 16, wherein a focal length of the third lens element is f3, a focal length of the sixth lens element is f6, and the following condition is satisfied:

$-0.70<f3/f6<5.0.$

20. The optical imaging lens system of claim 16, wherein an axial distance between an image-side surface of the sixth lens element and an image surface is BL, the axial distance between the fifth lens element and the sixth lens element is T56, and the following condition is satisfied:

$0<BL/T56<1.80.$

21. The optical imaging lens system of claim 16, wherein a curvature radius of the object-side surface of the fourth lens element is R7, a curvature radius of the image-side surface of the fourth lens element is R8, and the following condition is satisfied:

$-0.45<R8/R7<3.0.$

22. The optical imaging lens system of claim 16, wherein either an object-side surface of the sixth lens element, an image-side surface of the sixth lens element or both the object-side surface and the image-side surface of the sixth lens element have at least one non-axial critical point, the focal length of the optical imaging lens system is f, a vertical distance between the at least one non-axial critical point closest to an optical axis on any surface of the sixth lens element and the optical axis is Yc6x, and the following condition is satisfied:

$0<Yc6x/f<1.80.$

23. The optical imaging lens system of claim 16, wherein a curvature radius of an image-side surface of the second lens element is R4, a maximum effective radius of the image-side surface of the second lens element is SD22, and the following condition is satisfied:

$0.05<R4/SD22<1.30.$

24. The optical imaging lens system of claim 16, wherein an Abbe number of the third lens element is V3, an f-number of the optical imaging lens system is Fno, and the following condition is satisfied:

$10<V3*Fno<60.$

25. The optical imaging lens system of claim 16, wherein the optical imaging lens system is for being operated within a wavelength range of 750 nm to 950 nm; the focal length of the optical imaging lens system is f, an entrance pupil diameter of the optical imaging lens system is EPD, and the $0.70<f/EPD<1.80.$ 26. An optical imaging lens system comprising six lens elements, the six lens elements being, in order from an object side to an image side:
a first lens element having negative refractive power;
a second lens element having negative refractive power;
a third lens element;
a fourth lens element having an object-side surface being concave in a paraxial region thereof and an image-side surface being convex in a paraxial region thereof;
a fifth lens element having positive refractive power; and
a sixth lens element having an object-side surface being convex in a paraxial region thereof;
wherein the optical imaging lens system has a total of six lens elements, a focal length of the optical imaging lens system is f, an axial distance between the fifth lens element and the sixth lens element is T56, a curvature radius of an image-side surface of the third lens element is R6, a curvature radius of the object-side surface of the fourth lens element is R7, a sum of central thicknesses of the six lens elements of the optical imaging lens system is ΣCT, a sum of axial distances between each of all adjacent lens elements of the six lens elements of the optical imaging lens system is ΣAT, and the following conditions are satisfied:

$0<f/T56<10.0;$ $-1.0<(R6+R7)/(R6-R7)<12.0;$ and $0.45<\Sigma CT/\Sigma AT<3.50.$ 27. The optical imaging lens system of claim 26, wherein at least one of the six lens elements of the optical imaging lens system has an Abbe number smaller than 25.

28. The optical imaging lens system of claim 27, wherein an axial distance between the first lens element and the second lens element is T12, a central thickness of the fifth lens element is CT5, and the following condition is satisfied:

$$0 < T12/CT5 < 2.70.$$

29. The optical imaging lens system of claim 26, wherein either the object-side surface of the sixth lens element, an image-side surface of the sixth lens element or both the object-side surface and the image-side surface of the sixth lens element have at least one non-axial critical point, the focal length of the optical imaging lens system is f, a vertical distance between the at least one non-axial critical point closest to an optical axis on any surface of the sixth lens element and the optical axis is Yc6x, and the following condition is satisfied:

$$0 < Yc6x/f < 1.80.$$

30. The optical imaging lens system of claim 26, wherein an axial distance between the first lens element and the second lens element is T12, a central thickness of the second lens element is CT2, a displacement in parallel with an optical axis from an axial vertex of an image-side surface of the first lens element to a maximum effective radius position of the image-side surface of the first lens element is SAG12, and the following condition is satisfied:

$$|(T12+CT2)/SAG12| < 1.80.$$

* * * * *